United States Patent
Li et al.

(10) Patent No.: US 11,743,773 B2
(45) Date of Patent: Aug. 29, 2023

(54) FLOW CONTROL METHOD AND APPARATUS

(71) Applicant: HUAWEI TECHNOLOGIES CO., LTD., Guangdong (CN)

(72) Inventors: You Li, Shenzhen (CN); Shitong Yuan, Chengdu (CN); Yuanping Zhu, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/175,339

(22) Filed: Feb. 12, 2021

(65) Prior Publication Data

US 2021/0168656 A1 Jun. 3, 2021

Related U.S. Application Data

(63) Continuation of application No. PCT/CN2019/096910, filed on Jul. 19, 2019.

(30) Foreign Application Priority Data

Aug. 20, 2018 (CN) .......................... 201810947904.3

(51) Int. Cl.
  *H04W 28/10* (2009.01)
  *H04B 7/26* (2006.01)
  *H04W 28/02* (2009.01)

(52) U.S. Cl.
  CPC .......... *H04W 28/10* (2013.01); *H04B 7/2606* (2013.01); *H04W 28/0278* (2013.01); *H04W 28/0289* (2013.01)

(58) Field of Classification Search
  CPC ......... H04W 28/0236; H04W 28/0273; H04W 28/0278; H04W 28/0289; H04W 28/06;
  (Continued)

(56) References Cited

U.S. PATENT DOCUMENTS 9,781,654 B2 10/2017 Wang et al.
2019/0297555 A1\* 9/2019 Hampel ............ H04W 28/0289
(Continued)

FOREIGN PATENT DOCUMENTS

CN 102056242 A 5/2011
CN 105992392 A 10/2016
(Continued)

OTHER PUBLICATIONS

EPO Communication pursuant to Rule 164(1) EPC Partial Supplementary European Search Report issued in European Application No. 19850989.5 dated Jun. 23, 2021, 16 pages.
(Continued)

*Primary Examiner* — Harun Chowdhury
(74) *Attorney, Agent, or Firm* — Fish & Richardson P.C.

(57) ABSTRACT

This application provides a flow control method and apparatus, and relates to the field of communications technologies. A relay device indicates flow control to an upper-level node to avoid spectrum resources waste because of excessively small amount of data transmission or an excessively large amount of data transmission from an upper-level node. The method includes: A first node determines to indicate a second node to perform flow control; and the first node sends a first flow control indication to the second node. The first flow control indication is carried in adaptation layer control signaling, an RLC control message, or a MAC CE. The first flow control indication includes identifiers of one or more bearers and flow control information. The second node is a relay node or a donor base station.

14 Claims, 9 Drawing Sheets

(58) Field of Classification Search
CPC .. H04W 28/10; H04W 88/14; H04W 36/0005
USPC ........................................ 370/229, 252, 328
See application file for complete search history.

(56) References Cited

U.S. PATENT DOCUMENTS

| | | | |
|---|---|---|---|
| 2021/0219183 A1* | 7/2021 | Huang | H04W 28/0236 |
| 2021/0250817 A1* | 8/2021 | Zou | H04W 36/0005 |
| 2021/0282050 A1* | 9/2021 | Adjakple | H04W 28/06 |
| 2021/0314809 A1* | 10/2021 | Teyeb | H04W 28/0278 |
| 2021/0377784 A1* | 12/2021 | Marco | H04W 88/14 |

FOREIGN PATENT DOCUMENTS

| | | |
|---|---|---|
| WO | 2011082550 A1 | 7/2011 |
| WO | 2017004255 A1 | 1/2017 |

OTHER PUBLICATIONS

Extended European Search Report in European Application No. 19850989.5, dated Aug. 18, 2021, 16 pages.

CATT, "How to implement flow control in IAB," 3GPP TSG-RAN WG2#103, R2-1811854, Gothenburg, Sweden, Aug. 20-24, 2018, 4 pages.

Huawei, "Consideration about the F1*-C," 3GPP TSG-RAN WG2#103, R2-1812889, Gothenburg, Sweden, Aug. 20-24, 2018, 4 pages.

3GPP TS 38.300 V15.2 0 (Jun. 2018), "3rd Generation Partnership Project; Technical Specification Group Radio Access Network; NR; NR and NG-RAN Overall Description; Stage 2 (Release 15)," Jun. 2018, 87 pages.

ZTE, "Discussion on flow control in IAB," 3GPP TSG-RAN WG2 Meeting #103, R2-1812463, Gothenburg, Sweden, Aug. 20-24, 2018, 5 pages.

LG Electronics Inc, "Flow control in IAB node," 3GPP TSG-RAN WG2 NR Ad Hoc #4, R2-1810432, Montreal, Canada, Jul. 2-6, 2018, 2 pages.

LG Electronics Inc., "Summary of [AH1807#19][IAB] IAB Flow Control and Congestion Handling," 3GPP TSG-RAN WG2 #103, R2-1812518, Gothenburg, Sweden, Aug. 20-24, 2018, 27 pages.

Sequans Communications,"Flow control considerations for IAB," 3GPP TSG-RAN WG2#NR AH1807, R2-1810451, Miontreal, Canada, Jul. 2-6, 2018, 4 pages.

Sequans Communications, "Flow control for PDCP operation", 3GPP TSG-RAN WG2 Meeting #103, R2-1812865, Gothenburg, Sweden, Aug. 20-24, 2018, 4 pages.

3GPP TS 38.475 V0.3.0 (Oct. 2017), "3rd Generation Partnership Project; Technical Specification Group Radio Access Network; NG Radio Access Network (NG-RAN); F1 interface user plane protocol (Release 15)," Oct. 2017, 16 pages.

Huawei et al., "Modification of positioniong SIBs," 3GPP TSG-RAN WG2 Meeting #103, R2-1812899, Gothenburg, Sweden, Aug. 20-24, 2018, 2 pages.

3GPP TS 37.340 V15.2.0 (Jun. 2018), 3rd Generation Partnership Project; Technical Specification Group Radio Access Network; Evolved Universal Terrestrial Radio Access (E-UTRA) and NR; Multi-connectivity; Stage 2 (Release 15), Jun. 2018, 55 pages.

3GPP TS 38.425 V15.2.0 (Jun. 2018), "3rd Generation Partnership Project; Technical Specification Group Radio Access Network; NG-RAN; NR user plane protocol (Release 15)," Jun. 2018, 21 pages.

3GPP TS 38.473 V15.2.1 (2018-07), "3rd Generation Partnership Project;Technical Specification Group Radio Access Network; NG-RAN; F1 application protocol (F1AP) (Release 15)," Jul. 2018, 161 pages.

Samsung Electronics R&D Institute UK, "Design options and NR specs impact for different placements of the IAB adaptation layer," 3GPP TSG-RAN WG2 NR ad-hoc #18-07, R2-1809614, Montreal, Canada, Jul. 2-6, 2018, 4 pages.

LG Electronics Inc et al., "Bearer mapping in IAB node," 3GPP TSG-RAN2 Meeting AdHoc#1807, R2-1810810, Montreal, Canada, Jul. 2-6, 2018, 3 pages.

Ericsson, "Corrections to Minimum Desired Buffer Size," 3GPP TSG-RAN WG3 Meeting #99, R3-181322, Athens, Greece, Feb. 26-Mar. 2, 2018, 2 pages.

Ericsson, "Corrections to Minimum Desired Buffer Size," 3GPP TSG-RAN WG3 Meeting #99bis, R3-182196, Sanya, China, Apr. 16-20, 2018, 2 pages.

Office Action in Chinese Application No. 201810947904.3, dated Feb. 3, 2021, 19 pages.

PCT International Search Report and Written Opinion in International Application No. PCT/CN2019/096910, dated Oct. 22, 2019, 12 pages.

Ericsson, "Flow control in multi-hop IAB networks," 3GPP TSG-RAN WG2 #103, R2-1812217, Gothenburg, Sweden, Aug. 20-24, 2018, 7 pages.

Office Action issued in Chinese Application No. 201810947904.3 dated Apr. 6, 2022, 4 pages.

Huawei, "Some considerations about congestion handling and flow control for IAB networks," 3GPP TSG-RAN WG2#103, R2-1812711, Gothenburg, Sweden, Aug. 20-24, 2018, 5 pages.

Office Action issued in Chinese Application No. 201810947904.3 dated Sep. 28, 2021, 8 pages.

* cited by examiner

FLOW CONTROL METHOD AND APPARATUS

CROSS-REFERENCE TO RELATED APPLICATIONS

This application is a continuation of International Application No. PCT/CN2019/096910, filed on Jul. 19, 2019, which claims priority to Chinese Patent Application No. 201810947904.3, filed on Aug. 20, 2018. The disclosures of the aforementioned applications are hereby incorporated by reference in their entireties.

TECHNICAL FIELD

The present invention relates to the field of communications technologies, and in particular, to a flow control method and apparatus in a wireless relay system.

BACKGROUND

In comparison with a 4th generation mobile communications system (4G), a 5th generation mobile communications system (5G) has higher overall requirements on various network performance. For example, capacity will be 1000 times over 4G, and wider coverage, and ultra-reliable and low latency will be supported in 5G. In consideration of abundant frequency resources of high-frequency band, it is predicted that small cell using high-frequency band would be popular in order to meet an ultra-high capacity requirement of the 5G in a hotspot area. The high-frequency band has a relatively poor propagation feature, and is severely attenuated when being blocked which lead to small coverage by using small cell operating in high-frequency. Consequently a large quantity of small cells need to be densely deployed. If optical fiber backhauls are deployed for the large quantity of densely deployed small cells, the costs would be very high and deployment would be very difficult. Therefore, an economical and convenient backhaul solution is necessary. In addition, from a perspective of a requirement for wide coverage, optical fiber deployment is difficult and expensive for providing network coverage in some rural areas. Such scenario also requires for a flexible and convenient access and backhaul solution. An integrated access and backhaul (IAB) technology provides a feasible solution for providing an ultra-high capacity and extended coverage. Both an access link and a backhaul link of the IAB use radio transmission, to avoid a costs problem caused by the optical fiber deployment.

However, when the radio transmission is used for both the access link and the backhaul link of the IAB, a transmission rate on a radio link varies or a radio link is even interrupted because the radio transmission is easily affected by an environment or other interference. The IAB system has relatively complex interference cases due to the IAB system in 5G system supports multi-hop transmission. Meanwhile, a high frequency band is easily affected by the environment when a high-frequency band e.g. 10 GHz or higher frequency band is supported by the IAB system. Therefore, the transmission rate of each IAB node in the IAB system varies which may lead to congestion on a plurality of nodes because varying of the radio transmission rate of an IAB node. It is therefore necessary to implement a flow control mechanism in the IAB system to resolve a congestion problem of the IAB node caused by varying of the transmission rate on a radio link.

SUMMARY

Embodiments of this application provide a flow control method and apparatus for a relay node, to resolve the following problem: A packet loss occurs due to buffer congestion on one or more bearers when a downlink data rate on a backhaul link of a relay node is greater than an uplink/a downlink transmission data rate on an access link in a relay system, or resources are wasted due to flow control causing an excessively low data rate of receiving performed by a relay node on a backhaul link.

To achieve the foregoing objective, the following technical solutions are used in the embodiments of this application.

According to a first aspect, a flow control method is provided. The method is applied to a wireless relay system. The wireless relay system includes a first node and a second node. The second node is an upper-level node of the first node. The method includes: The first node determines to indicate the second node to perform flow control; and the first node sends a first flow control indication to the second node. The first flow control indication is carried in adaptation layer control signaling, an RLC control message, or a MAC CE. The first flow control indication is used by the second node to control, based on the first flow control indication, a data rate of transmission to the first node. The first flow control indication includes identifiers of one or more bearers and flow control information. The second node is a relay node or a donor base station. In the foregoing technical solution, the first flow control indication is sent to the second node, so that the second node can perform flow control on the one or more bearers based on the first flow control indication, thereby alleviating resource waste caused due to congestion of the first node or an insufficient amount of received data.

In a possible implementation of the first aspect, the flow control information includes at least one of the following information: a flow control level indication, a reduced value of a data rate, an increased value of a data rate, duration of flow control, and a timestamp.

In a possible implementation of the first aspect, the first flow control indication further includes a flow control identifier, an identifier of the first node, and/or an identifier of a terminal device.

In a possible implementation of the first aspect, the first flow control indication is used by the first node to indicate the second node to reduce a transmission rate, or by the first node to indicate the second node to increase a transmission rate.

In a possible implementation of the first aspect, that the first node determines to indicate the second node to perform flow control includes: The first node determines that a data volume of a receive buffer in the first node is greater than a first threshold, that a data volume of a transmit buffer to a lower-level node is greater than a second threshold, or that a data volume of a shared buffer on a first bearer is greater than a third threshold; and the first node determines to indicate the second node to perform flow control.

In a possible implementation of the first aspect, the first node sends a buffer configuration report to the second node. The buffer configuration report includes at least one of: the identifiers of the one or more bearers, a buffer size on an MT, a buffer size on a DU, or a shared buffer size. In the foregoing technical solution, by using the buffer configuration report, the first node enables the second node to control data transmission of the first node based on information in the buffer configuration report, thereby reducing probability of congestion.

In a possible implementation of the first aspect, the first node receives a buffer configuration report response sent by the second node.

In a possible implementation of the first aspect, the first node receives a buffer configuration report request sent by the second node. The buffer configuration report request includes the identifier of the one or more bearers. In the foregoing technical solution, the second node actively sends the buffer configuration report request, so that the second node can obtain buffer information of the one or more bearers of the first node. In this way, the second node can control a data transmission rate based on information of one or more buffers of the first node, thereby reducing probability of congestion.

In a possible implementation of the first aspect, the second node is a relay node, and the wireless relay system further includes a donor base station. The first node sends a second flow control indication to the donor base station. The second flow control indication is carried in an F1* interface message, an RRC message, adaptation layer control signaling, or a PDCP control message. The second flow control indication is used by the donor base station to control a data rate of transmission to the first node. The second flow control indication includes at least one of the following information: the identifier of the first node, a flow control identifier, an identifier of a bearer, an identifier of a terminal device, a flow control level indication, a reduced value of a data rate, an increased value of a data rate, duration of flow control, a timestamp, and an expected buffer size of a bearer. In the foregoing technical solution, the donor base station controls a data rate on the one or more bearers of the first node, to effectively control probability of congestion of the one or more bearers of the first node in an IAB system, or avoid a problem of relatively low spectral efficiency caused due to an excessively small data flow received by the first node. In addition, long-term control can be implemented by using the donor base station. A mechanism of fast flow control and long-term flow control may be further implemented through joint control performed by the donor base station and the second node, to improve overall transmission performance of the IAB system.

According to a second aspect, a flow control method is provided. The method is applied to a wireless relay system. The wireless relay system includes a first node and a second node. The second node is an upper-level node of the first node. The method includes: The second node receives a first flow control indication sent by the first node. The first flow control indication is carried in adaptation layer control signaling, an RLC control message, or a MAC CE. The first flow control indication is used by the second node to control, based on the first flow control indication, a data rate of transmission to the first node. The first flow control indication includes an identifier of one or more bearers and flow control information. The second node is a relay node or a donor base station. In the foregoing technical solution, the second node controls, based on the first flow control indication, the one or more bearers requested by the first node. In this way, the following case is avoided: Due to insufficient buffers, a packet loss occurs on a data packet in the bearer requested by the first node.

In a possible implementation of the second aspect, the flow control information includes at least one of the following information: a flow control level indication, a reduced value of a data rate, an increased value of a data rate, duration flow control, and a timestamp.

In a possible implementation of the second aspect, the first flow control indication further includes at least one of: a flow control identifier, an identifier of the first node, and an identifier of a terminal device.

In a possible implementation of the second aspect, the first flow control indication is used by the first node to indicate the second node to reduce a transmission rate, or by the first node to indicate the second node to increase a transmission rate.

In a possible implementation of the second aspect, the second node receives a buffer configuration report sent by the first node. The buffer configuration report includes at least one of: the identifiers of the one or more bearers, a buffer size on an MT, a buffer size on a DU, or a shared buffer size. In the foregoing technical solution, by using the buffer configuration report, the first node enables the second node to control data transmission of the first node based on information in the buffer configuration report, thereby reducing probability of congestion.

In a possible implementation of the second aspect, the second node sends a buffer configuration report response to the first node.

In a possible implementation of the second aspect, the second node sends a buffer configuration report request to the first node. The buffer configuration report request includes the identifier of the one or more bearers. In the foregoing technical solution, the second node actively sends the buffer configuration report request, so that the second node can obtain buffer information of the one or more bearers of the first node. In this way, the second node can control a data transmission rate based on information of one or more buffers of the first node, thereby reducing probability of congestion.

According to a third aspect, a flow control method is provided. The method is applied to a wireless relay system. The wireless relay system includes a first node, a second node, and a donor base station. The second node is an upper-level node of the first node. The method includes: The donor base station receives a second flow control indication sent by the first node. The second flow control indication is carried in an F1* interface message, an RRC message, adaptation layer control signaling, or a PDCP control message. The second flow control indication is used by the donor base station to control a data rate of transmission to the first node. The second flow control indication includes at least one of the following information: an identifier of the first node, a flow control identifier, an identifier of a bearer, an identifier of a terminal device, a flow control level indication, a reduced value of a data rate, an increased value of a data rate, duration of flow control, a timestamp, and an expected buffer size of a bearer. In the foregoing technical solution, the donor base station controls, based on the second flow control indication, the one or more bearers requested by the first node. In this way, the following case is avoided: Due to insufficient buffers, a packet loss occurs on a data packet in the bearer requested by the first node. The donor base station performs flow control on the one or more bearers requested by the first node, to prevent congestion of another relay node in an IAB system.

In a possible implementation of the third aspect, the donor base station receives a buffer configuration report sent by the first node. The buffer configuration report includes at least one of: identifiers of one or more bearers, a buffer size on an MT, a buffer size on a DU, or a shared buffer size.

In a possible implementation of the third aspect, the donor base station sends a buffer configuration report response to the first node.

In a possible implementation of the third aspect, the donor base station sends a buffer configuration report request to the first node. The buffer configuration report request includes the identifier of the one or more bearers. In the foregoing technical solution, the donor base station actively sends the buffer configuration report request, so that the donor base station can obtain buffer information of the one or more bearers of the first node. In this way, the donor base station can control a data transmission rate based on information of one or more buffers of the first node, thereby reducing probability of congestion and improving overall performance of the IAB system.

In a possible implementation of the third aspect, the donor base station sends a third flow control indication to the second node. The third flow control indication includes the identifiers of the one or more bearers. In the foregoing technical solution, the donor base station sends flow control indications to all upper-level nodes of the first node, to avoid performance deterioration of the entire IAB system caused due to congestion caused because the second node receives a flow control indication of the first node.

According to another aspect of this application, a first node is provided. The first node is configured to implement a function of the flow control method provided in the first aspect or any possible implementation of the first aspect. The function may be implemented by hardware, or may be implemented by hardware by executing corresponding software. The hardware or the software includes one or more units corresponding to the foregoing function.

In a possible implementation, a structure of the first node includes a processor. The processor is configured to support user equipment in performing the flow control method provided in the first aspect or any possible implementation of the first aspect. Optionally, the first node may further include a memory and a communications interface. The communications interface includes a transceiver. The memory stores code and data. The memory is coupled to the processor, and the communications interface is coupled to the processor or the memory.

According to another aspect of this application, a second node is provided. The second node is configured to implement a function of the flow control method provided in the second aspect or any possible implementation of the second aspect. The function may be implemented by hardware, or may be implemented by hardware by executing corresponding software. The hardware or the software includes one or more units corresponding to the foregoing function.

In a possible implementation, a structure of the second node includes a processor. The processor is configured to support the second node in implementing the function of the flow control method provided in the second aspect or any possible implementation of the second aspect. Optionally, the second node may further include a memory and a communications interface. The communications interface includes a transceiver. The memory stores code required for processing and/or a baseband processor. The memory is coupled to the processor, and the communications interface is coupled to the processor or the memory.

According to another aspect of this application, a donor base station is provided. The donor base station is configured to implement a function of the flow control method provided in the third aspect or any possible implementation of the third aspect. The function may be implemented by hardware, or may be implemented by hardware by executing corresponding software. The hardware or the software includes one or more units corresponding to the foregoing function.

In a possible implementation, a structure of the donor base station includes a processor. The processor is configured to support the donor base station in implementing the function of the flow control method provided in the third aspect or any possible implementation of the third aspect. Optionally, the donor base station may further include a memory and a communications interface. The communications interface includes a transceiver. The memory stores code required for processing and/or a baseband processor. The memory is coupled to the processor, and the communications interface is coupled to the processor or the memory.

According to another aspect of this application, a computer readable storage medium is provided. The computer readable storage medium stores an instruction. When the instruction is run on a computer, the computer is enabled to perform the flow control method provided in the first aspect or any possible implementation of the first aspect, or perform the flow control method provided in the second aspect or any possible implementation of the second aspect, or perform the flow control method provided in the third aspect or any possible implementation of the third aspect.

According to another aspect of this application, a computer program product including an instruction is provided. When the computer program product runs on a computer, the computer is enabled to perform the flow control method provided in the first aspect or any possible implementation of the first aspect, or perform the flow control method provided in the second aspect or any possible implementation of the second aspect, or perform the flow control method provided in the third aspect or any possible implementation of the third aspect.

According to another aspect of this application, a communications system is provided. The communications system includes a plurality of devices. The plurality of devices include a first node and a second node. The second node is a relay node or a donor base station. The first node is the first node provided in the foregoing aspects, and is configured to support the first node in performing the flow control method provided in the first aspect or any possible implementation of the first aspect; and/or the second node is the second node provided in the foregoing aspects, and is configured to support the second node in performing the flow control method provided in the second aspect or any possible implementation of the second aspect; and/or the system may further include a donor base station, the second node is a relay node, and the donor base station is the donor base station provided in the foregoing aspects, and is configured to support the donor base station in performing the flow control method provided in the third aspect or any possible implementation of the third aspect.

According to another aspect of this application, an apparatus is provided. The apparatus is a processor, an integrated circuit, or a chip. The apparatus is configured to perform steps performed by a processing unit, a receiving unit, and a sending unit of a first node in the embodiments of the present invention. For example, the apparatus determines to indicate a second node to perform flow control, or the first node processes a received message or processes a to-be-sent message. The apparatus may further have a function of the communications interface in the foregoing other aspects or the embodiments. Details are described in the embodiments. Details are not described herein.

According to another aspect of this application, another apparatus is provided. The apparatus is a processor, an integrated circuit, or a chip. The apparatus is configured to perform steps performed by a processing unit, a receiving unit, and a sending unit of a second node in the embodiments of the present invention. For example, the second node processes a received message or processes a to-be-sent message. The apparatus may further have a function of the communications interface in the foregoing other aspects or the embodiments. Details are described in the embodiments. Details are not described herein.

According to another aspect of this application, another apparatus is provided. The apparatus is a processor, an integrated circuit, or a chip. The apparatus is configured to perform steps performed by a processing unit, a receiving unit, and a sending unit of a donor base station in the embodiments of the present invention. For example, the donor base station processes a received message or processes a to-be-sent message. The apparatus may further have a function of the communications interface in the foregoing other aspects or the embodiments. Details are described in the embodiments. Details are not described herein.

It may be understood that the apparatus for the flow control method, the computer storage medium, or the computer program product provided above is used to perform the corresponding method provided above. Therefore, for beneficial effects of the apparatus, the computer storage medium, or the computer program product, refer to the beneficial effects in the corresponding method provided above. Details are not elaborated herein again.

DESCRIPTION OF EMBODIMENTS

The following describes the technical solutions in the embodiments of the present invention with reference to the accompanying drawings in the embodiments of the present invention. Clearly, the described embodiments are merely some but not all of the embodiments of the present invention. All other embodiments obtained by a person skilled in the art based on the embodiments of the present invention without creative efforts shall fall within the protection scope of the present invention.

It should be understood that names of all nodes and messages in this application are merely names set in this application for ease of description. The nodes or the messages may have different names in actual networks. It should not be understood that this application limits the names of various nodes and messages. On the contrary, any name that has the same or similar functions of the node or the message used in this application is considered as an equivalent replacement in the method of this application, and shall fall within the protection scope of this application. Repeated descriptions are not provided below.

In consideration of high bandwidth in a future wireless network, it is considered to introduce an IAB solution into 5G new radio (NR) to further reduce deployment costs and improve deployment flexibility, thereby further introducing a relay of integrated access and backhaul. In this application, a relay node supporting the integrated access and backhaul is referred to as an IAB node to be differentiated from a relay in LTE. A system including an IAB node is also referred to as a relay system.

Figure 1:
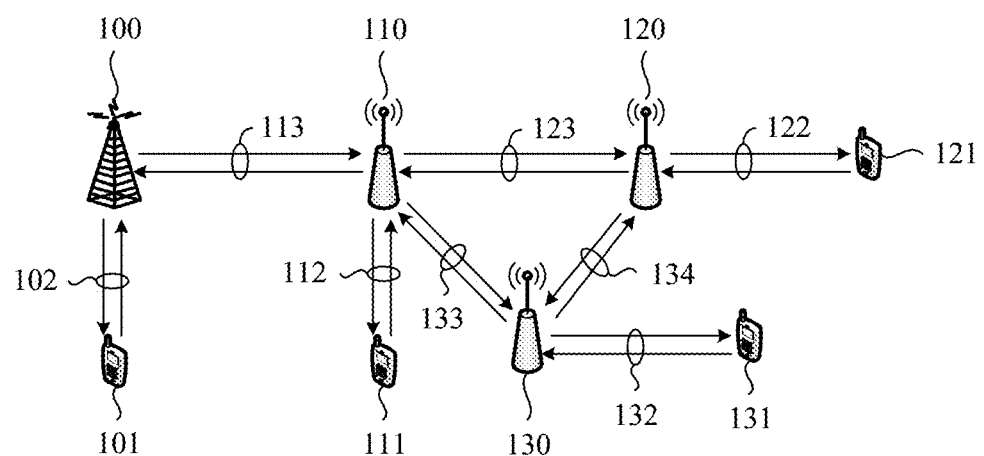
FIG. 1 shows an IAB communications system according to an embodiment of this application.

To better understand a flow control method and apparatus disclosed in the embodiments of the present invention, the following first describes a network architecture used in the embodiments of the present invention. FIG. 1 is a schematic structural diagram of a communications system according to an embodiment of this application.

It should be noted that the communications system mentioned in this embodiment of this application includes but is not limited to a narrowband Internet of things (NB-IoT) system, a wireless local area network (WLAN) system, an LTE system, a next-generation 5G mobile communications system, a communications system beyond 5G such as NR, or a device to device (D2D) communications system.

In the communications system shown in FIG. 1, an integrated access and backhaul IAB system is provided. The IAB system includes at least one base station 100, one or more terminal devices (terminal) 101 served by the base station 100, one or more relay nodes: IAB nodes, and one or more terminal devices 111 served by the IAB node 110. Generally, the base station 100 is referred to as a donor next generation NodeB (DgNB). The IAB node 110 is connected to the base station 100 by using a wireless backhaul link 113. The donor base station is also referred to as a donor node in this application. The base station includes but is not limited to: an evolved NodeB (eNB), a radio network controller (RNC), a NodeB (NB), a base station controller (BSC), a base transceiver station (BTS), a home eNodeB (for example, a home evolved NodeB or a home NodeB, HNB), a baseband unit (BBU), an eLTE (eLTE) base station, an NR base station (gNB), and the like. The terminal device includes but is not limited to: user equipment (UE), a mobile console, an access terminal, a subscriber unit, a subscriber station, a mobile station, a remote station, a remote terminal, a mobile device, a terminal, a wireless communications device, a user agent, a station (ST) in a wireless local area network (WLAN), a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a mobile console in a future 5G network, and a terminal device in a future evolved public land mobile network (PLMN). The IAB node is a specific name of a relay node, and does not constitute a limitation on the solution in this application. The IAB node may be the foregoing base station or terminal device having a forwarding function, or may be in an independent device form.

The integrated access and backhaul system may further include a plurality of other IAB nodes, for example, an IAB node 120 and an IAB node 130. The IAB node 120 is connected to the IAB node 110 through a wireless backhaul link 123 to access a network, and the IAB node 130 is connected to the IAB node 110 through a wireless backhaul link 133 to access the network. The IAB node 120 serves one or more terminal devices 121, and the IAB node 130 serves one or more terminal devices 131. In FIG. 1, both the IAB node 110 and the IAB node 120 are connected to the network through the wireless backhaul links. In this application, the wireless backhaul link is all viewed from a perspective of a relay node. For example, the wireless backhaul link 113 is a backhaul link of the IAB node 110, and the wireless backhaul link 123 is a backhaul link of the IAB node 120. As shown in FIG. 1, an IAB node such as the IAB node 120 may be connected to another IAB node 110 through a wireless backhaul link such as the wireless backhaul link 123, to be further connected to the network. In addition, a relay node may be connected to the network by using a plurality of levels of wireless relay nodes. It should be understood that the IAB node in this application is merely used for a description requirement, and does not indicate that the solutions in this application are used only in an NR scenario. In this application, the IAB node may represent any node or device having a relay function. It should be understood that the IAB node and the relay node used in this application have the same meaning.

For ease of description, the following defines basic terms or concepts used in this application.

An upper-level node: A node such as the node 110 that provides a wireless backhaul link resource is referred to as an upper-level node of the IAB node 120.

A lower-level node: A node that transmits data to the network by using a backhaul link resource or receives data from the network is referred to as a lower-level node. For example, the node 120 is referred to as a lower-level node of the relay node 110. The network is a network above a core network or another access network, for example, the Internet or a dedicated network.

An access link: An access link indicates a radio link used when a node communicates with a lower-level node of the node, and includes a link used for uplink transmission and a link used for downlink transmission. The uplink transmission on the access link is also referred to as uplink transmission of the access link, and the downlink transmission on the access link is also referred to as downlink transmission of the access link. The node includes but is not limited to the foregoing IAB node.

A backhaul link: A backhaul link indicates a radio link used when a node communicates with an upper-level node of the node, and includes a link used for uplink transmission and a link used for downlink transmission. The uplink transmission on the backhaul link is also referred to as uplink transmission of the backhaul link, and the downlink transmission on the backhaul link is also referred to as downlink transmission of the backhaul link. The node includes but is not limited to the foregoing IAB node.

Generally, the lower-level node may be considered as a terminal device of the upper-level node. It should be understood that, in the integrated access and backhaul system shown in FIG. 1, one IAB node is connected to one upper-level node. However, in a future relay system, to improve reliability of a wireless backhaul link, an IAB node such as the IAB node 120 may have a plurality of upper-level nodes that simultaneously provide services for the IAB node. For example, the IAB node 130 in the figure may be further connected to the IAB node 120 through a backhaul link 134, that is, both the IAB node 110 and the IAB node 120 are upper-level nodes of the IAB node 130. The names of the IAB nodes 110, 120, and 130 do not limit a scenario or a network in which the nodes are deployed. For example, the nodes may have any other names such as a relay and an RN. The use of the IAB node in this application is merely for convenient description.

In FIG. 1, radio links 102, 112, 122, 132, 113, 123, 133, and 134 may be bidirectional links, including uplink and downlink transmission links. In particular, the wireless backhaul links 113, 123, 133, and 134 may be used by upper-level nodes to provide services for lower-level nodes. For example, the upper-level node 100 provides wireless backhaul services for the lower-level node 110. It should be understood that an uplink and a downlink of the backhaul link may be separated from each other, that is, transmission on the uplink and transmission on the downlink are not performed by using a same node. The downlink transmission indicates that an upper-level node such as the node 100 transmits information or data to a lower-level node such as the node 110. The uplink transmission indicates that a lower-level node such as the node 110 transmits information or data to an upper-level node such as the node 100. The node is not limited to a network node or a terminal device. For example, in a D2D scenario, the terminal device may be used as a relay node to serve another terminal device. In some scenarios, the wireless backhaul link may further be an access link. For example, the backhaul link 123 may also be considered as an access link for the node 110, and the backhaul link 113 is also an access link for the node 100. It should be understood that the upper-level node may be a base station or may be a relay node, and the lower-level node may be a relay node or may be a terminal device having a relay function. For example, in a D2D scenario, the lower-level node may also be a terminal device.

The relay node such as the node 110, 120, or 130 shown in FIG. 1 may exist in two forms. One form is that the relay node exists as an independent access node and may independently manage a terminal device connected to the relay node. In this case, the relay node usually has an independent physical cell identifier (PCI). The relay node in this form usually needs to have a complete protocol stack function, for example, a radio resource control (RRC) function. The relay is usually referred to as a layer 3 relay. In another form, the relay node and the donor node such as a donor eNB or a donor gNB belong to a same cell. User management is implemented by the donor base station such as a donor node. In this case, the relay is usually referred to as a layer 2 relay. The layer 2 relay usually exists as a DU of the base station DgNB in an NR centralized unit and distributed unit (CU-DU) architecture, and communicates with a CU by using an F1-AP (F1 application protocol) interface or a tunneling protocol. The tunneling protocol may be, for example, a general packet radio service tunneling protocol (GTP) protocol. Details are not described. The donor node indicates a node by using which the core network can be accessed, or an anchor base station of a radio access network. The network can be accessed by using the anchor base station. The anchor base station is responsible for receiving data of the core network and forwarding the data to a relay node, or receiving data of a relay node and forwarding the data to the core network. Generally, a donor node in a relay system is referred to as an IAB donor. In this application, the two nouns may be used alternately. It should not be understood that the IAB donor and the donor node are entities or network elements that have different functions.

Figure 2:
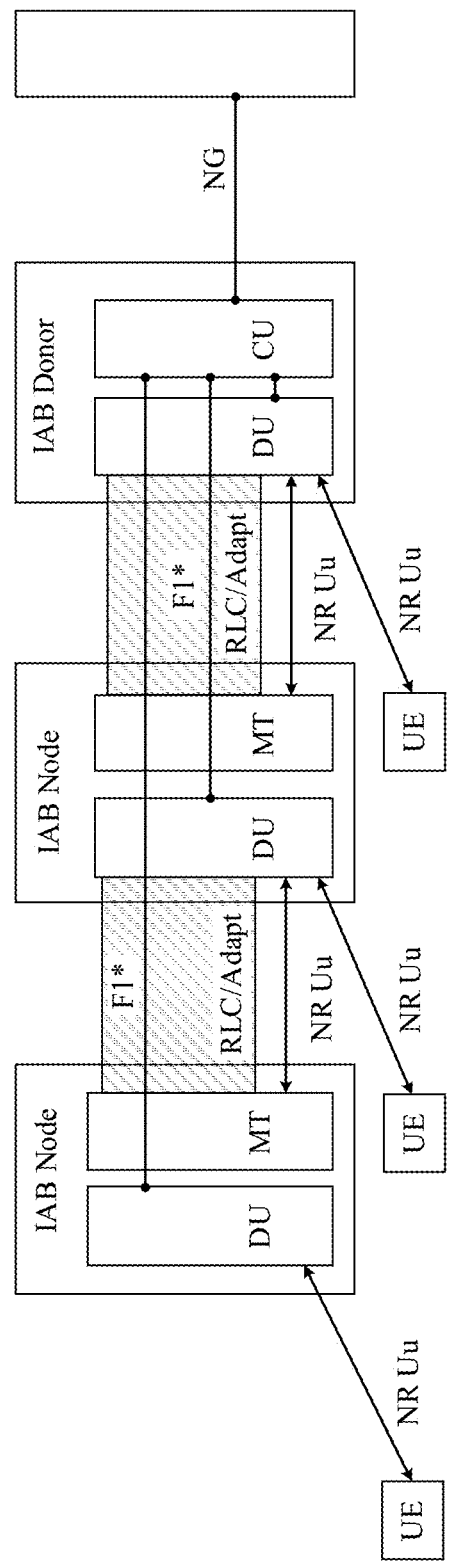
FIG. 2 is a schematic diagram of an architecture 1a of an IAB system according to an embodiment of this application.

FIG. 2 is a schematic diagram of an architecture 1*a* of an IAB system. One IAB node may have functions of a DU and an MT (Mobile-Termination). The function of the MT is similar to a function of a mobile terminal that terminates a radio interface layer of a Uu interface of a backhaul link to a donor or another IAB node. The DU mainly provides an access function for a terminal device or a node served by the IAB node, that is, a function of the Uu interface. For example, the DU may provide a wireless connection function for NR UE or a lower-level IAB node. From the DU to an IAB donor, the DU may be connected to the IAB donor by using an F1* interface. F1* is an optimized or a modified F1 interface. The F1 interface is an interface from a DU to a CU. As described above, a connection between the IAB node and an upper-level node is implemented by using the Uu interface. Therefore, the IAB node is connected to a DU of the upper-level IAB node by using an MT. The IAB node may be connected to the upper-level IAB node by using a radio link control (RLC) layer/an adaptation layer. FIG. 2 is merely an example of the architecture 1*a* of the IAB system. The IAB system further supports architectures 1*b*, 2*a*, and 2*b*. A difference is that interfaces used between the IAB node and the IAB donor are different, thereby causing a protocol stack change. Specific architectures 1*b*, 2*a*, and 2*b* are not described in detail in this application. For details, refer to the 3GPP TR 38.874 protocol. It should be understood that an architecture of the IAB system is not limited in this application, and the solutions of this application are applicable to architectures of various IAB systems.

Figure 3:
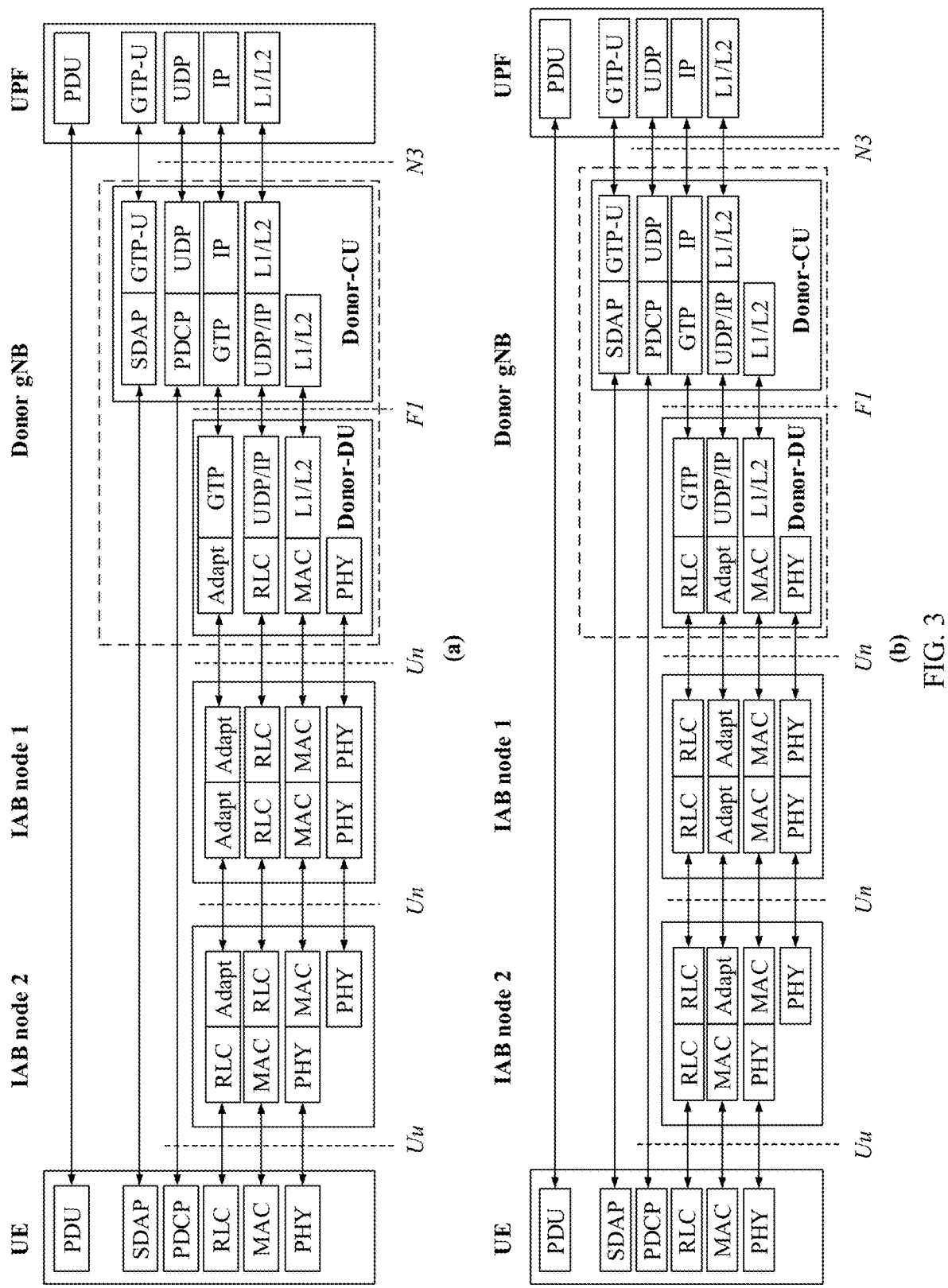
FIG. 3 is a schematic diagram of a protocol stack structure in which an adaptation layer is in an architecture 1a or 1b of an IAB system according to an embodiment of this application.

For the architecture 1*a* or 1*b* of the IAB system, a new layer is introduced, that is, an adaptation layer. A main function of the adapt layer is to provide routing information, so that hop-by-hop forwarding becomes possible. Because a layer 2 relay does not have a PDCP layer, related routing information is needed to provide information for the hop-by-hop forwarding. FIG. 3 is a schematic diagram of a protocol stack structure in which an adaptation layer is in an architecture 1*a* or 1*b* of an IAB system. FIG. 3(*a*) is a protocol stack structure in which an adaptation layer is located above an RLC layer, and FIG. 3(*b*) is a protocol stack structure in which an adaptation layer is located below an RLC layer. It should be understood that the adaptation layer shown in FIG. 3 may alternatively exist as a sublayer of the RLC layer or a MAC layer. This is not limited in this application. In FIG. 3, if an IAB node such as an IAB node 2 is the last IAB node, that is, there is no other IAB node below the IAB node 2. In this case, the IAB node does not need to support an adaptation layer function on an access link. However, the adaptation layer function needs to be supported from the IAB node 2 to an IAB node 1. Because the IAB node 1 needs to access a donor gNB upwards, a service needs to be provided for the IAB node 2 on an access link. Therefore, the adaptation layer function needs to be supported on both an access link side and a backhaul link side. It should be understood that a protocol stack on the access link side corresponds to a protocol stack of a DU, and a protocol stack on the backhaul link side corresponds to a protocol stack of an MT. In the figure, a UPF is a user plane function. For a specific function of each protocol layer, refer to the 3GPP TR 38.874 protocol. Details are not described.

In the IAB system, both the backhaul link and the access link use wireless transmission. The wireless transmission is relatively apparently affected by an environment, for example, by an interference problem caused by dense deployment. If the IAB system uses a high frequency band such as a 10 GHz or 30 GHz frequency band, the high frequency band is easily affected by the environment, for example, by an obstruction, causing obvious signal fading. In addition, there may be a relatively large difference between the access link and the backhaul link. For example, because the backhaul link has a relatively high transmission height, a signal is relatively stable; and because the access link is easily affected by a ground environment, for example, an obstruction or an obstacle, a signal is unstable, thereby slowing a transmission rate. Therefore, for an IAB node that uses the wireless backhaul, a flow imbalance between the access link and the backhaul link may occur instantaneously or within a period of time for the access link and the backhaul link, causing congestion on the IAB node. When congestion occurs on an IAB node, a packet loss may occur. For a wireless system, the packet loss causes retransmission, causing resource consumption and reducing resource use efficiency. Therefore, in a wireless relay system, a flow control mechanism needs to be used to resolve a congestion problem.

Currently, in an NR system, uplink transmission is usually controlled through scheduling of a base station. Therefore, uplink transmission of the IAB system on the backhaul link is also controlled through scheduling of an upper-level node. The uplink transmission on the backhaul link affects uplink transmission on the access link. Therefore, flow control may be implemented through uplink scheduling of the IAB node.

However, for downlink transmission, an existing downlink data delivery status (DDDS) is used to implement flow control between a primary node and a secondary node in a dual connection. The DDDS is usually implemented in a manner in which the primary node sends a polling request by using a PDCP layer, and the secondary node feeds back the DDDS to the primary node, that is, the DDDS is implemented at the PDCP layer.

In the IAB system, a DU of a layer 2 IAB node does not support the PDCP layer. Therefore, a DDDS mechanism cannot be implemented in a layer 2 relay system. In addition, because the IAB system supports multi-hop transmission, the IAB node may be connected to the IAB donor through a plurality of hops. If the IAB node is controlled by the IAB donor, serious congestion or a packet loss is caused for the IAB node. Therefore, it is necessary to implement fast congestion control, that is, implement hop-by-hop congestion control to rapidly alleviate a congestion state of the IAB node.

To resolve the foregoing problem, an embodiment provides a flow control method. The method is applied to a wireless relay system. The wireless relay system includes a first node and a second node. The second node is an upper-level node of the first node. The method includes: The first node determines to indicate the second node to perform flow control; and the first node sends a first flow control indication to the second node. The first flow control indication is carried in adaptation layer control signaling, an RLC control message, or a MAC CE. The first flow control indication is used by the second node to control, based on the first flow control indication, a data rate of transmission to the first node. The first flow control indication includes identifiers of one or more bearers and flow control information. The second node is a relay node or a donor base station.

The flow control information includes at least one of the following information: a flow control level indication, a reduced value of a data rate, an increased value of a data rate, duration of flow control, or a timestamp.

The first flow control indication further includes a flow control identifier, an identifier of the first node, and/or an identifier of a terminal device.

The first flow control indication is used by the first node to indicate the second node to reduce a transmission rate, or by the first node to indicate the second node to increase a transmission rate.

The foregoing method further includes: The first node sends a buffer configuration report to the second node. The buffer configuration report includes at least one of: identifiers of the one or more bearers, a buffer size of an MT, a buffer size of a DU, or a buffer size of a shared buffer.

Figure 4:
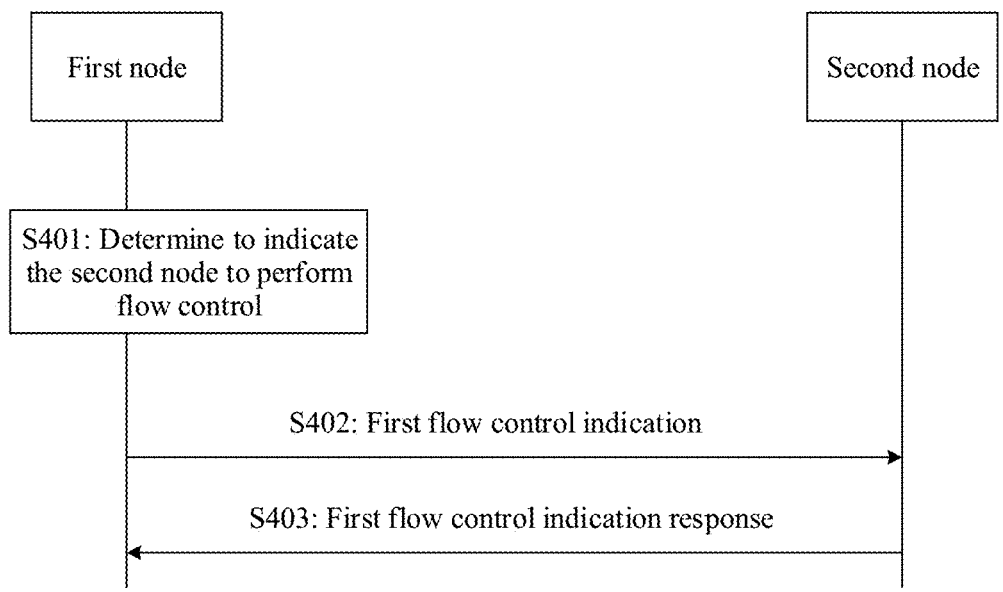
FIG. 4 is a flowchart of flow control in downlink transmission according to an embodiment of this application.

FIG. 4 is a flowchart of flow control in downlink transmission according to an embodiment of this application. In the figure, the second node is an upper-level node of the first node. The second node may be an IAB node, or may be an IAB donor. This is not limited in this application. Steps in this embodiment are as follows:

S401: The first node determines to indicate the second node to perform flow control.

The first node receives data of the second node over a backhaul link. As described above, the second node may do not know a current buffer status of the first node in a downlink direction. In a possible case, radio signal degradation on some links of an access link of the first node may cause a decrease in a transmission rate. Therefore, downlink receiving of the first node on the backhaul link may do not match downlink transmission on the access link. As a result, buffered data in the first node is increased sharply. A packet loss is caused if control is not implemented. To implement flow control, the first node needs to have a function of flow monitoring. When a specific condition is met, the first node determines that the upper-level node needs to be indicated to perform flow control in downlink transmission.

Specifically, that the first node determines to indicate the second node to perform flow control includes: The first node determines that a data volume of a receive buffer in the first node is greater than a first threshold, that a data volume of a transmit buffer to a lower-level node is greater than a second threshold, or that a data volume of a shared buffer on a first bearer is greater than a third threshold; and the first node determines to indicate the second node to perform flow control. It should be understood that the receive buffer herein may be a buffer of a specific bearer. In an IAB system, data forwarding may be implemented in a plurality of manners. The data forwarding may be data transmission performed based on an IAB node, or may be data transmission performed based on a bearer. The data transmission based on an IAB node means that an IAB node is used as a scheduling granularity, and data flows or bearers transmitted by the IAB node are not differentiated. In this manner of data transmission, quality of service (QoS) control cannot be well implemented. Another possibility is to distinguish data transmitted by each IAB, and implement different control or scheduling on different bearers or data flows. The bearer in this application indicates a set of services having a specific QoS attribute, for example, a PDCP bearer; or a specific data flow; or one or more data packets (for example, a data flow of a slice) of a flow; or transmission corresponding to a logical channel of an RLC layer. The bearer may be identified by using an identifier of the bearer. In different scenarios, the identifier of the bearer may be different. For example, if the bearer corresponds to the PDCP bearer (for example, a data radio bearer (DRB)), the identifier of the bearer is the same as an identifier of the PDCP bearer. If the bearer corresponds to an RLC backhaul channel or an RLC bearer, the identifier of the bearer corresponds to an identifier of the RLC channel or an identifier of the RLC bearer. If the bearer corresponds to a MAC logical channel, the identifier of the bearer is a logic channel identifier (LCID). This application does not limit the identifier of the bearer.

Figure 5:
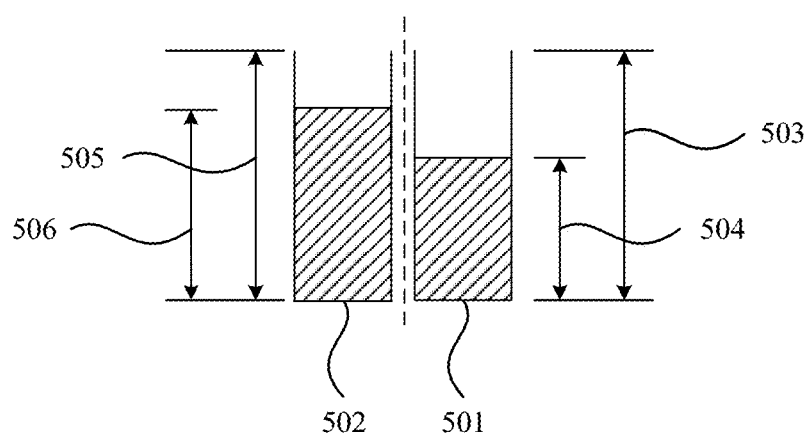
FIG. 5 is a schematic diagram of buffers in a first node according to an embodiment of this application.

The foregoing data volume in the buffer indicates a buffered data volume in the buffer, or a percentage of the buffered data volume to a total buffer volume. FIG. 5 is a schematic diagram of a buffer of a first node (an IAB node). In FIG. 5, 501 is a buffer of an MT in a second node, 502 is a buffer of a DU in the second node, 503 indicates a total buffer size of a bearer of the MT, 504 indicates data that has been buffered in a bearer of the MT, 505 indicates a total buffer size of a bearer of the DU, and 506 indicates data that has been buffered in a bearer of the DU. Each bearer served by the IAB node has a buffer of an MT and a buffer of a DU. It should be understood that FIG. 5 is merely an example. For the bearer served by the IAB node, the MT and the DU may share a buffer. In other words, 501 and 502 in FIG. 5 are combined into one buffer, that is, a shared buffer. This is not limited in this application. Correspondingly, a receive buffer: the buffer 501 of the MT is used to receive data of a backhaul link, and a transmit buffer to a lower-level node is the buffer 502 of the DU and is used to send data to the lower-level node or a terminal device on an access link. A volume of buffered data of a first bearer indicates a volume of data buffered in the bearer served by the first node. In other words, a volume of data stored in the shared buffer is greater than a first threshold. The first threshold may be a specific buffer size, or a percentage of a volume of buffered data to a total buffer size. In an example, the volume of buffered data may be the data volume of 504 or 506 in FIG. 5, or may be a percentage of 504 to the total buffer size 503, or a percentage of 506 to 505. The first threshold may be, for example, 40 M bytes (megabyte), and the total buffer size is 50 M bytes. Alternatively, for example, the first threshold is 0.8, which indicates that congestion occurs on the first node when 80% of the total buffer size is reached. A second threshold and a third threshold are similar to the first threshold. Details are not elaborated. It should be understood that values of the first threshold, the second threshold, and the third threshold may be the same or different. This is not limited in this application.

That the first node determines to indicate the second node to perform flow control indicates that the first node determines to indicate, by using an indication, the second node to perform flow control on the first node or the one or more bearers served by the first node. The flow control includes reducing a data rate of transmission of the first node or the one or more bearers served by the first node, or increasing a data rate of transmission of the first node or the one or more bearers served by the first node. Details are not elaborated again in the following.

In a possible implementation, different degrees of congestion may be defined. A defining method is to determine different degrees of congestion through defining different thresholds. Specifically, the first node determines a flow control level based on a volume of data buffered in a bearer. For example, when a volume of data buffered in a shared buffer of a bearer reaches 60%, it is determined that slight congestion occurs; when a volume of data buffered in a shared buffer of a bearer reaches 75%, it is determined that moderate congestion occurs; or when a volume of data buffered in a shared buffer of a bearer reaches 90%, it is determined that severe congestion occurs.

In a possible implementation, that the first node determines to indicate the second node to perform flow control specifically includes: The first node determines that a difference between a data rate of receiving performed by the first node and a data rate of transmission to a lower-level node is greater than a fourth threshold; and the first node determines to indicate the second node to perform flow control. For example, if a receiving data rate of the MT of the first node on the backhaul link is greater than a transmission data rate of the DU on the access link, congestion may occur on the first node. The first node may determine based on a current buffer status whether congestion occurs. It is assumed that the total buffer size of the DU of the first node is Z, the receiving data rate on the backhaul link is $R_B$, the transmission data rate on the access link is $R_A$, and $R_B > R_A$. For example, it is determined that congestion occurs when a volume of buffered data reaches 70% of a total buffer on the access link. It is assumed that a reaction time for the first node to determine congestion is T seconds and a current buffer size of the DU is $C_b$.

$$Z \times 0.7 - C_b = T \times (R_B - R_A)$$

Therefore, the difference $(R_B - R_A)$ between the data rate of receiving performed by the first node and the data rate of transmission to the lower-level node can be obtained. If the difference between the data rate of receiving performed by the first node and the data rate of transmission to the lower-level node is greater than the threshold $R_B - R_A$, that is, the fourth threshold, it is determined that congestion occurs. It should be understood that this is merely an example. The difference between the data rate of receiving performed by the first node and the data rate of transmission to the lower-level node may be alternatively determined by using another method. For example, the fourth threshold is a predefined value. This is not limited in this application.

The foregoing describes a congestion determining method of the first node when congestion occurs on the first node or a bearer served by the first node. If the first node indicates the second node to perform congestion control, the upper-level node will reduce data volume transmitted in downlink for the first node or a bearer served by the first node. If signal quality on the access link of the first node is improved, performance of the access link may be significantly improved. Therefore, the first node may request the second node to increase data volume of transmission for the first node or a bearer served by the first node.

Therefore, in a possible implementation, that the first node determines to indicate the second node to perform flow control includes: The first node determines that a data volume in a receive buffer of the first node is less than a fifth threshold, that a data volume in a transmit buffer to a lower-level node is less than a sixth threshold, or that a data volume in a shared buffer of a first bearer is less than a seventh threshold; and the first node determines to indicate the second node to perform flow control. Herein, the fifth threshold, the sixth threshold, and the seventh threshold are similar to the first threshold. Details are not elaborated again. A difference is that, when determining that data in a buffer is less than a specific threshold, the first node may determine to indicate an upper-level node to perform flow control. In this case, the flow control is to increase data volume of transmission. The buffer includes the receive buffer of the MT of the first node on the backhaul link, or the transmit buffer of the DU on the access link, or the shared buffer of the first bearer.

In a possible implementation, that the first node determines to indicate the second node to perform flow control includes: The first node determines that a difference between a data rate of receiving performed by the first node and a data rate of transmission to a lower-level node is less than an eighth threshold; and the first node determines to indicate the second node to perform flow control. In the foregoing process, the first node determines, based on a data volume in a buffer to indicate the upper-level node to increase the data volume of transmission. Different from the foregoing process, the first node may alternatively indicate the upper-level node to increase the data volume of transmission, when the difference between the data rate of receiving performed by the first node on the backhaul link and the data rate of transmission to the lower-level node is less than a predetermined threshold.

S402: The first node sends a first flow control indication to the second node.

The first flow control indication is carried in adaptation layer control signaling, an RLC control message, or an MAC CE. The first flow control indication is used by the second node to control, based on the first flow control indication, a data rate of transmission to the first node. The first flow control indication includes identifiers of one or more bearers and flow control information.

As described above, when the first node has no PDCP function, flow control cannot be implemented by using an existing mechanism. Therefore, a new mechanism is needed to implement flow control. In addition, it is also difficult for the existing mechanism to provide relatively good flow control. In this application, the first node actively sends the flow control indication to the second node, so that the second node can quickly react. Because an adaption layer is newly added to the IAB node, it may be considered to use an adaptation layer message to implement control. For example, control information is added into adaptation layer control signaling or an adaptation layer data packet header. An advantage is that control may be implemented on a specific bearer. It is because the adaptation layer can obtain information about the bearer or the PDCP bearer. Another method for providing the first flow control indication is to perform transmission by using an RLC control message or an RLC data packet header. The RLC control message needs to be newly added, or a format of the RLC data packet header needs to be modified. The first flow control indication may further be transmitted by using media access control control element (MAC CE). If the transmission is performed by using the MAC CE, a signaling format of the MAC CE needs to be redefined to implement the transmission of the first flow control indication. A specific definition of the signaling format depends on a protocol.

That the second node controls, based on the first flow control indication, the data rate of transmission to the first node includes: The second node controls, based on the identifiers of the one or more bearers in the first flow control instruction, the data rate of transmission of the one or more bearers to the first node. Specifically, when congestion occurs on the one or more bearers in the first flow control indication, the second node reduces a data rate of transmission of the one or more bearers. Alternatively, different flow control manners may be used for the one or more bearers. In other words, in the first flow control indication, data rates of transmission need to be reduced for some bearers in the first flow control indication, and data rates of transmission need to be increased for the other bearers. Therefore, the bearers may be grouped, and the bearers that require different flow control are grouped.

Specifically, the second node identifies a control method for each bearer by using the first flow control indication. The control method includes: reducing a data rate of transmission, or increasing a data rate of transmission. Specifically, the second node identifies the control method for each bearer by using the flow control information in the first flow control indication. The flow control method may be for a node, or for a terminal device. In particular, control is implemented for a bearer.

In addition to the foregoing identifier of one or more bearers and the foregoing flow control information, the flow control information may further include at least one of a flow control identifier, the identifier of the first node, and an identifier of a terminal device. Each field has the following meaning:

The flow control identifiers are mainly used to indicate a control manner of the one or more bearers. For example, 1 bit may be used to implement the flow control identifier. For example, 0 indicates to reduce a data rate of transmission, and 1 indicates to increase a data rate of transmission. The flow control identifiers may be used to implement control for the one or more bearers. Alternatively, a flow control identifier field may be used for each bearer for identification. This is not limited in this application. If the flow control is only used for congestion control, data rates of transmission are reduced for all the bearers. In this case, this field is not mandatory and depends on a definition in a protocol.

The identifier of the first node is mainly used to identify a node that needs flow control. In a hop-by-hop flow control solution, this field is not mandatory.

The identifier of the terminal device: When a bearer is a PDCP bearer or a specific data flow, the identifier of the terminal device is used in combination with the bearer to indicate one or more bearers of the terminal device. A limited quantity of bits can be used for the bearer, and one IAB node may support a relatively large quantity of terminal devices. Therefore, the identifier of the terminal device and the identifier of the bearer need to be combined to jointly identify the bearer. It should be understood that an identifier of one terminal device may correspond to one or more bearers. When the bearer is a MAC logical channel, the identifier of the terminal device is not mandatory because the control is mainly performed on a logical channel of the first node in this case and the bearers of the terminal device are mapped to the logical channel of the first node.

The flow control information includes at least one of the following information: a flow control level indication, a reduced value of a data rate, an increased value of a data rate, duration of flow control, or a timestamp. The flow control information is mainly information related to the flow control. A specific meaning is as follows:

The flow control level indication is mainly used to indicate a congestion degree. As described above, the congestion degree of the first node may be slight congestion, moderate congestion, or severe congestion. The flow control level indication may be used in combination with other flow control information, or may be separately used to indicate the congestion degree of the first node. The second node controls, based on the congestion degree of the first node, the one or more bearers specified in the first flow control indication.

The reduced value of a data rate indicates a data rate that needs to be reduced for the one or more bearers. A unit of the data rate may be bit/s, or may be another unit. This is not limited in this application.

The increased value of a data rate indicates a data rate that needs to be increased for the one or more bearers. A unit of the data rate may be bit/s, or may be another unit. This is not limited in this application.

It should be understood that the foregoing reduced value of a data rate and the foregoing increased value of a data rate may both exist, or only one of the two values exists. The two values may be used in combination with the flow control level indication, or may not be used in combination with the flow control level indication. A specific case depends on the flow control method.

The duration of flow control is used to indicate a time of flow control. Because the flow control is an expected process, if the time of flow control is too short, a sharp change may occur on data in the one or more bearers of the first node, causing the buffers relatively unstable. Based on the duration of flow control, the bearer of the first node can be well controlled, and the sharp change may not occur. In particular, a flow control period or a time window may be defined and the same duration of flow control is used for flow control each time. Further, the first node may send the flow control indication according to a period. This field is not mandatory if the period is predefined or is configured for the first node by an upper-level node such as the second node or the donor node.

The timestamp is used to identify a start time from which congestion occurs in the first node. When flow control is implemented based on the duration, or the duration of flow control is included in the flow control information, the timestamp may indicate the start time. The field is not mandatory if the flow control period is defined and the flow control can be started from the beginning of the period.

In a possible implementation, the second node sends a flow control level parameter to the first node. The flow control level parameter includes data volumes buffered of specific bearers with specific congestion degrees. The congestion degree includes slight congestion, moderate congestion, and severe congestion. It should be understood that the congestion degree is merely an example, and may further include more congestion degree levels. The foregoing congestion degree may also include a plurality of congestion levels. Details are not described again. The data volume buffered includes an absolute data volume of the buffer or a relative data volume of the buffer. The relative data volume of the buffer is a percentage relative to a total buffer size of a bearer. It should be understood that the buffer of the bearer herein is merely an example. Specifically, a granularity of flow control is used, for example, control based on the terminal device, control based on the first node, or control based on the bearer. If the control is based on the node, the buffer should be a total buffer of the first node. The total buffer may be a total buffer of the MT or a total buffer of the DU. Control on the terminal device is similar. Details are not elaborated.

It should be understood that the foregoing second node may alternatively be a donor base station. In particular, when the first node is connected to the donor base station without an intermediate IAB node, the second node is the donor base station. Details are not elaborated again.

S403: The second node sends a first flow control indication response to the first node.

After receiving the first flow control indication, the second node sends the first flow control indication response to the first node. The first flow control indication response includes identifiers of one or more bearers that accepted for control, or only an acknowledgement message. The second node controls transmission of the first node based on both the identifiers of the one or more bearers and the flow control information. For example, a transmission rate of the one or more bearers is reduced.

In a possible scenario, data transmitted by the second node to the first node is also received from an upper-level node (for example, a third node). Because the second node reduces transmission to the first node, congestion occurs on a buffer of the second node. Therefore, the second node also triggers the third node to perform flow control. A method is similar. Finally, an IAB donor may be triggered. This process specifically depends on a flow status and a buffer status of an intermediate IAB node. The flow control method used when congestion occurs on the second node is similar to the operation of the first node. Details are not elaborated. Similar to S701, the second node may also determine whether to directly send an indication to the IAB donor. For example, if a data rate of receiving performed by the second node is less than an indicated data rate of receiving performed by the first node, the second node may directly send the indication to the IAB donor.

Based on the foregoing embodiment, fast flow control can be implemented, to avoid a packet loss caused due to congestion on the IAB node. In addition, a transmission problem of control signaling in the IAB system is resolved. This provides a feasible control method for the IAB system.

Figure 6:
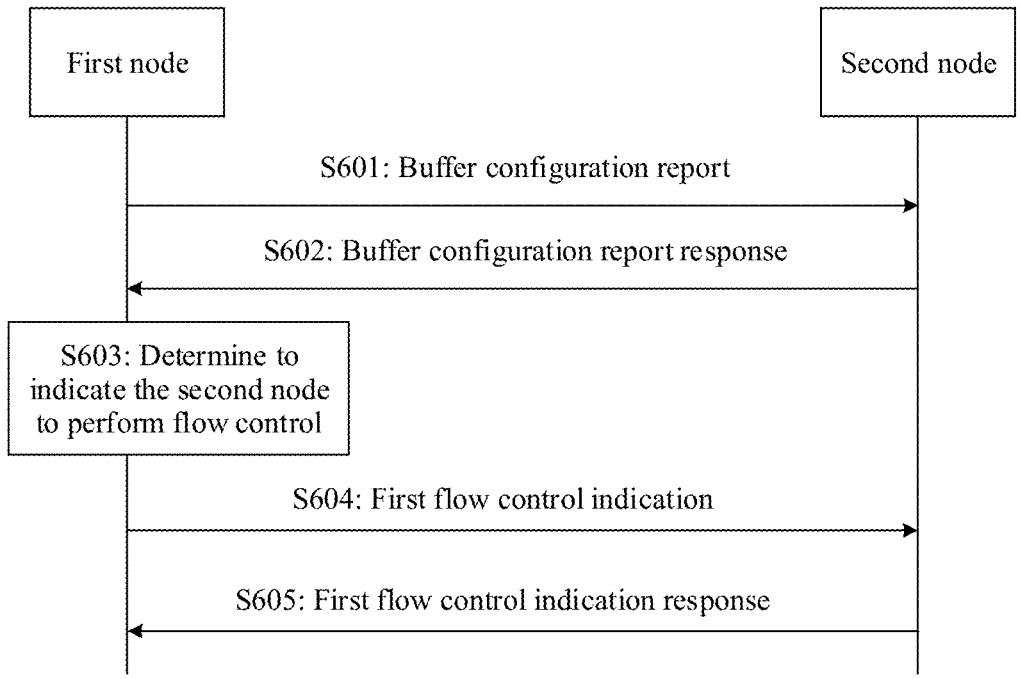
FIG. 6 is a flowchart in which a first node sends a buffer configuration report to a second node according to an embodiment of this application.

FIG. 6 is a flowchart in which a first node sends a buffer configuration report to a second node. Steps are as follows:

S601: The first node sends the buffer configuration report to the second node.

Specifically, the first node reports buffer configuration of each bearer to the second node. The buffer configuration indicates a total buffer size of a bearer. The total buffer size may be a buffer size for bears of a MT, or the buffer size for bears of a DU, or the shared buffer size for bears of both the MT and the DU. It should be understood that the buffer size for bears on the MT and the buffer size for bears on the DU may be both included in the buffer configuration report, or one of the two buffer sizes may be carried in the buffer configuration report. This is not limited in this application. A PDCP bearer may be set up directly from an IAB donor to a terminal device. An intermediate IAB node may not participate in a setup process of the PDCP bearer of the terminal device. Therefore, the buffer configuration for PDCP cannot be reported during the bearer setup process. In this case, in a data forwarding process, when forwarded data in a bearer is received for a first time, the buffer configuration may be reported by using adaptation layer signaling, an RLC control message, or an MAC CE. The buffer configuration report includes identifiers of one or more bearers, the buffer size on the MT, the buffer size on the DU, or the shared buffer size for both the MT and the DU. The buffer size on the MT and the buffer size on the DU may be reported separately, or may be reported together. Alternatively, only one of the two buffer sizes may be reported. In a scenario in which the MT and the DU share a buffer, the shared buffer size is reported.

Further, the buffer configuration report may further include a collected value of a maximum transmission rate or an actual transmission rate of the one or more bearers on an access link, to provide a scheduling basis for implementing flow control by the second node.

S602: The second node sends a buffer configuration report response to the first node.

The buffer configuration report response may include a flow control level parameter of the one or more bearers. The flow control level parameter is described above. Details are not elaborated again.

The first node performs flow monitoring on the one or more bearers based on the flow control level parameter. When a data volume specified by using the flow control level parameter is reached, the first flow control indication is triggered. The first flow control indication includes a flow control level indication.

Steps 603 to 605 are the same as steps 401 to 403. Details are not described again.

Figure 7:
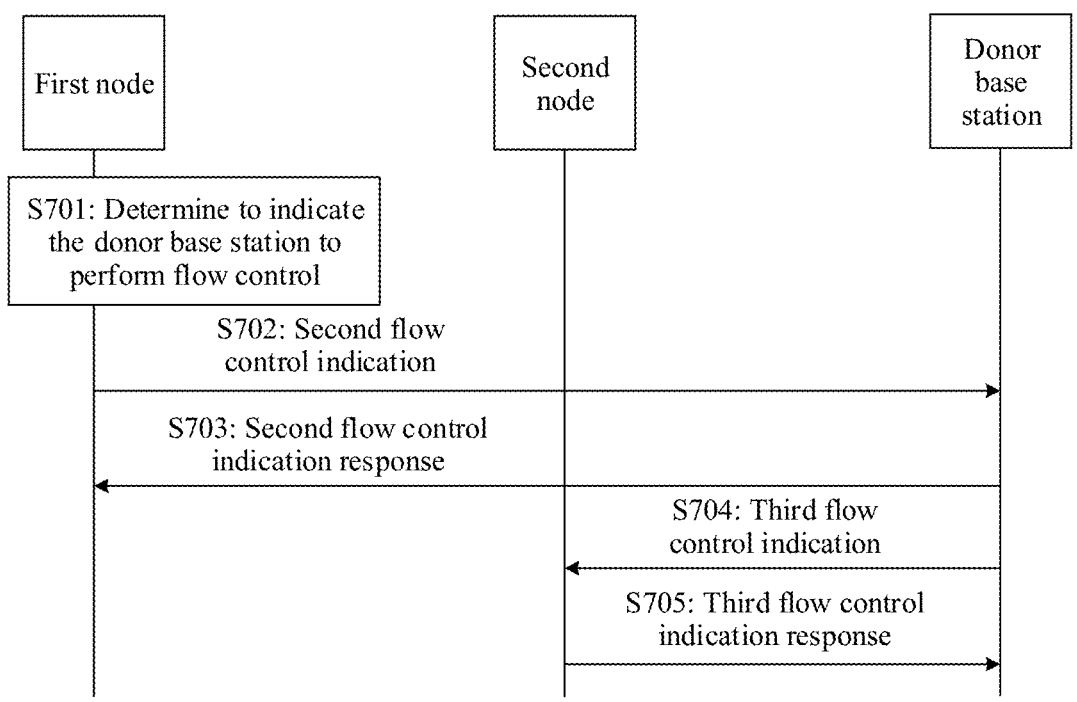
FIG. 7 is a flowchart of centralized flow control according to an embodiment of this application.

FIG. 7 is a flowchart of centralized flow control. A method shown in FIG. 7 is mainly that a first node directly controls a transmission rate of one or more bearers of the first node by using a donor base station. A method is as follows:

S701: The first node determines to indicate the donor base station to perform flow control. The method in which the first node determines to indicate the donor base station to perform flow control is the same as step S401. A difference is that a data volume in a buffer, or a used threshold of a data volume in transmission, or a difference between a data rate of receiving and a data rate of transmission to a lower-level node may be different from that in S401. A second node is an upper-level node of the first node. Hop-by-hop control is relatively effective. A plurality of hops may exist from the first node to the donor base station, causing a relatively long delay. Therefore, congestion control may be performed in advance, thereby avoiding a packet loss caused by proximity congestion. Another method of determining is not described.

For example, the first node may determine, based on a flow control level indication, whether a control indication needs to be sent to an IAB donor node.

Further, the first node may further obtain a data volume in a buffer of the second node and/or a data rate of receiving performed by the second node, to determine whether flow control is implemented only by the donor base station. For example, if the first node determines that a data transmission rate needs to be increased but the data rate of receiving performed by the second node is less than an expected receiving data rate of the first node, it indicates that the second node cannot provide a sufficient amount of data, and the donor node needs to input more data into a network or improve the data rate of receiving performed by the second node.

S702: The first node sends a second flow control indication to the donor base station.

Specifically, the second flow control indication is carried in an F1* interface message, an RRC message, adaptation layer control signaling, or a PDCP control message. The second flow control indication is used by the donor base station to control a data rate of transmission to the first node. The second flow control indication includes at least one of the following information: an identifier of the first node, a flow control identifier, an identifier of a bearer, an identifier of a terminal device, a flow control level indication, a reduced value of a data rate, an increased value of a data rate, duration of flow control, a timestamp, and an expected buffer size of a bearer.

An interface between the IAB donor and the first node serving as a DU to the IAB donor may be implemented in a plurality of different manners based on protocol architectures. For example, the first node is connected to a CU of the IAB donor by using an F1* interface or is connected based on an adaptation layer protocol to a DU directly connected to the IAB donor, or a DU of the first node is connected to a UPF of the IAB donor by using a protocol data unit (PDU) session. Due to different interfaces, the second flow control indication sent by the first node to the donor base station is carried in different control messages or interface messages. For example, when an MT of the first node is connected, by using the adaptation layer, to the DU which is directly connected to the IAB donor, the second flow control indication may be sent to the IAB donor by using adaptation layer control signaling, a PDCP layer control message in the MT of the first node, or an RRC message in the MT. When the first node is connected to the CU of the IAB donor by using the F1* interface, because transmission of a PDCP layer and an RRC layer may be further performed by using F1*, the second flow control indication may be sent by using the F1* interface message, a PDCP control message, or an RRC message. Regardless of a specific message or specific signaling used to transmit the second flow control indication, a format of the second flow control indication needs to be redefined. It should be understood that F1* herein merely indicates that the interface is an improved or optimized F1-AP interface, and F1* is not limited to its name.

Because the second flow control indication may be carried in different messages or different signaling in different architectures, content included in the second flow control indication in different messages or different signaling may also be different. For example, (a) The first node is connected to the DU which is directly connected to the IAB donor by using the adaptation layer. The first node may control data flows in one or more bearers of a terminal device, or may control a plurality of terminal devices. Each terminal device may have one or more bearers on which flow control is to be performed. Therefore, the second flow control indication needs to include the identifier of the terminal device and the identifiers of the bearers. The second flow control indication may further include the identifier of the first node, a flow control identifier, a flow control level indication, a reduced value of a data rate, an increased value of a data rate, flow control duration, a timestamp, and an expected buffer size of a bearer. The expected buffer size of a bearer is used to indicate a maximum data volume that can be received in a bearer. Other parameters are the same as the foregoing descriptions. Details are not described again.

(b) The first node is connected to the CU of the IAB donor by using the F1* interface. The CU can obtain information of the first node by using the F1* interface. Therefore, the second flow control instruction includes the identifier of the terminal device and the identifier of the bearer. The second flow control indication may further include a flow control identifier, a flow control level indication, a reduced value of a data rate, an increased value of a data rate, duration of flow control, a timestamp, and an expected buffer size of a bearer.

The duration of flow control in the second flow control indication may also be a time window of the flow control. Specifically, the time window of the flow control is configurable. A basic unit of the time window may be, for example, bit/s. The time window may be specifically defined by using a protocol. This is not limited in this application. For example, if the second flow control indication is transmitted by using a PDCP control message, the expected buffer size of a bearer and the time window of the flow control may be both defined. In this case, there may be several implementations. For example, the expected buffer size of a bearer is used as a maximum value of an expected data volume, or the expected buffer size of a bearer is used as a currently available buffer size, thereby obtain a value of the time window. It is assumed that a remaining buffer of a bearer in an IAB node is $B_r$, a transmission rate on the access link is $R_A$, a data rate of receiving on the backhaul link is $R_B$, and a system reaction time is T. Herein, T is a value of the time window. The following may be obtained:

$$B_r + R_A * T = R_B * T$$

The value of the time window may be obtained by using the foregoing formula. It should be understood that the foregoing uses the shared buffer only as an example. A different case may occur when the MT and the DU have independent buffers. This is not limited in this application.

Specifically, a DDDS message may further include a time window indication of flow control. The time window indication of flow control indicates whether there is a time window of flow control. For example, 0 indicates that there is no time window, and 1 indicates that there is a time window.

S703: The donor base station sends a second flow control indication response to the first node.

After receiving the second flow control indication, the donor base station performs flow control on the specified one or more bearers based on the second flow control indication, and sends the second flow control indication response to the first node. The second flow control indication response may include an identifier of a controlled bearer, or may be merely an acknowledgment message.

Congestion of the first node may be basically controlled by using the foregoing steps S701 to S703, especially when parameters are properly set. However, when data transmission is performed at an application layer, a TCP window mechanism causes a fast increase in a data volume for transmission, and the donor base station performs fast data transmission to the first node, thereby causing congestion on a wireless bearer of the first node. Because a plurality of hops may exist from the donor base station to the first node, an IAB node between the first node and the donor base station buffers a large amount of data of a bearer. Therefore, congestion cannot be immediately alleviated when the first node sends the second flow control indication to the donor base station. It is because the intermediate node continues to forward data to the first node. Therefore, after receiving the second flow control indication of the first node, the donor base station sends a third flow control indication to the second node, that is, step S704.

S704: The donor base station sends the third flow control indication to the second node.

It should be understood that the second node is merely an example herein. The donor base station may send the third flow control indication to a plurality of second nodes at the same time. The plurality of second nodes include the IAB nodes that need to perform flow control for the bearers of the first node, in other words, one or more IAB nodes through which data transmission is performed from the donor base station to the first node.

The third flow control indication includes the identifiers of the one or more bearers, and may further include at least one of: the identifier of the first node, a flow control identifier, an identifier of a terminal device, a flow control level indication, a reduced value of a data rate, an increased value of a data rate, and duration of flow control.

For example, the donor base station may determine, based on the flow control level indication, whether the third flow control indication needs to be sent to the second node.

S705: The second node sends a third flow control indication response to the donor base station.

The second node receives the third flow control indication sent by the donor base station, sends the third flow control indication response to the donor base station, and performs flow transmission control on the first node.

In the foregoing embodiment, the first node sends the flow control indication to the donor base station, so that the donor base station can control a transmission rate or a data volume of a bearer. The donor base station can further control a transmission rate of each relay node to the first node, so that flow control can be effectively implemented, thereby avoiding a sharp concussion of network traffic or bearer traffic caused due to hop-by-hop control in an entire relay system.

Figure 8:
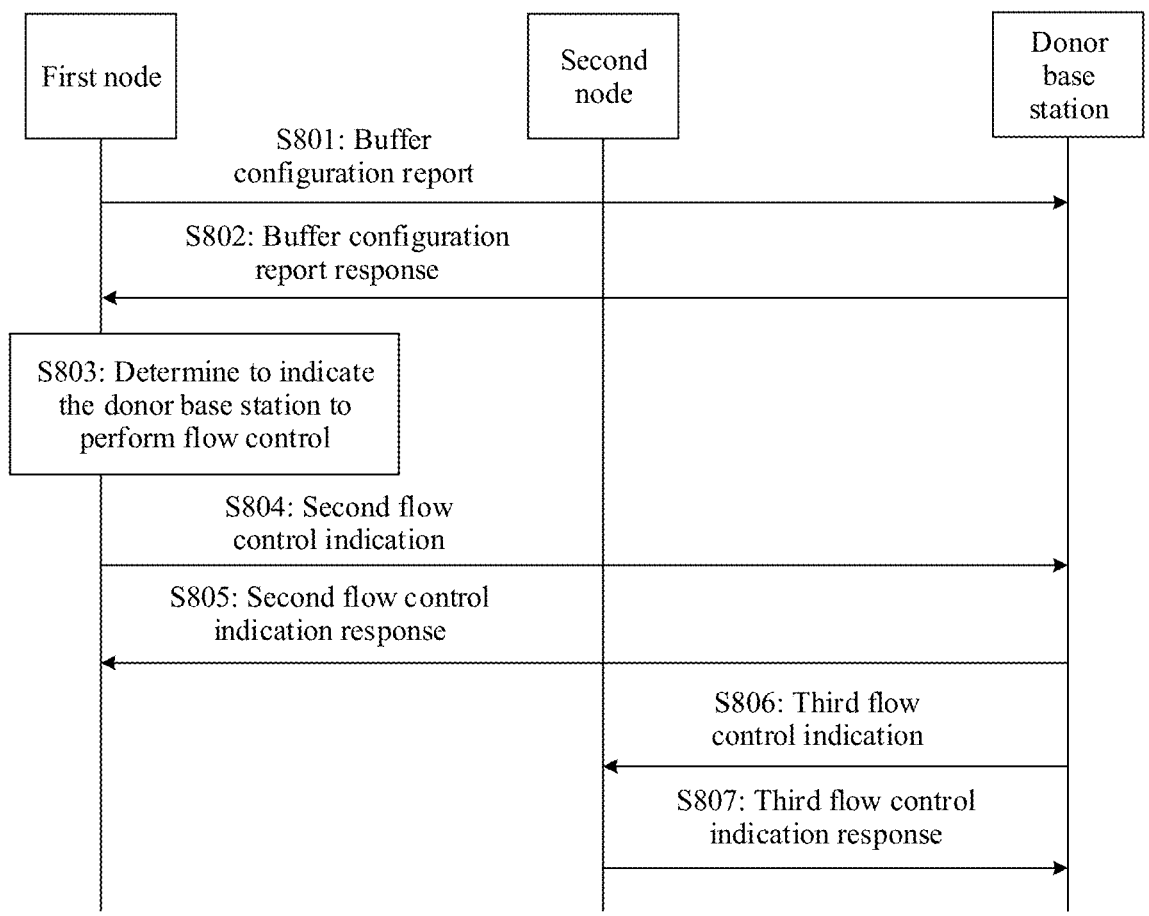
FIG. 8 is a flowchart in which a first node sends a buffer configuration report to a donor base station according to an embodiment of this application.

FIG. 8 is a flowchart in which a first node sends a buffer configuration report to a donor base station. Steps are as follows:

S801: The first node sends the buffer configuration report to the donor base station.

Specifically, the first node reports buffer configuration of each bearer to the donor base station. The buffer configuration report is the same as that in the S601. Details are not elaborated again.

Further, the buffer configuration report may further include a maximum transmission rates of one or more bearers on an access link, to provide a basis for implementing flow control by the donor base station.

S802: The donor base station sends a buffer configuration report response to the first node.

The buffer configuration report response may include a flow control level parameter of the one or more bearers. The flow control level parameter is described above. Details are not described again.

The first node performs flow monitoring on the one or more bearers based on the flow control level parameter. When a data volume specified by using the flow control level parameter is reached, a first flow control indication is triggered. The first flow control indication includes a flow control level indication.

Steps 803 to 807 are the same as steps 701 to 705. Details are not elaborated again.

In this embodiment of this application, the first node can effectively implement pre-control by using the buffer configuration report, to ensure stable running of an entire relay system and reduce a possibility of congestion.

In a possible implementation, the donor base station may send a buffer configuration report request to the first node. The buffer configuration report request includes identifiers of the one or more bearers. The buffer configuration report request may further include an identifier of a terminal device. Based on different IAB architectures, the buffer configuration report request may be carried in an F1* interface message, an RRC message, a PDCP control message, or adaptation layer control signaling. A specific manner is similar to the foregoing manner of carrying the buffer configuration report in signaling. Details are not elaborated again.

Figure 9:
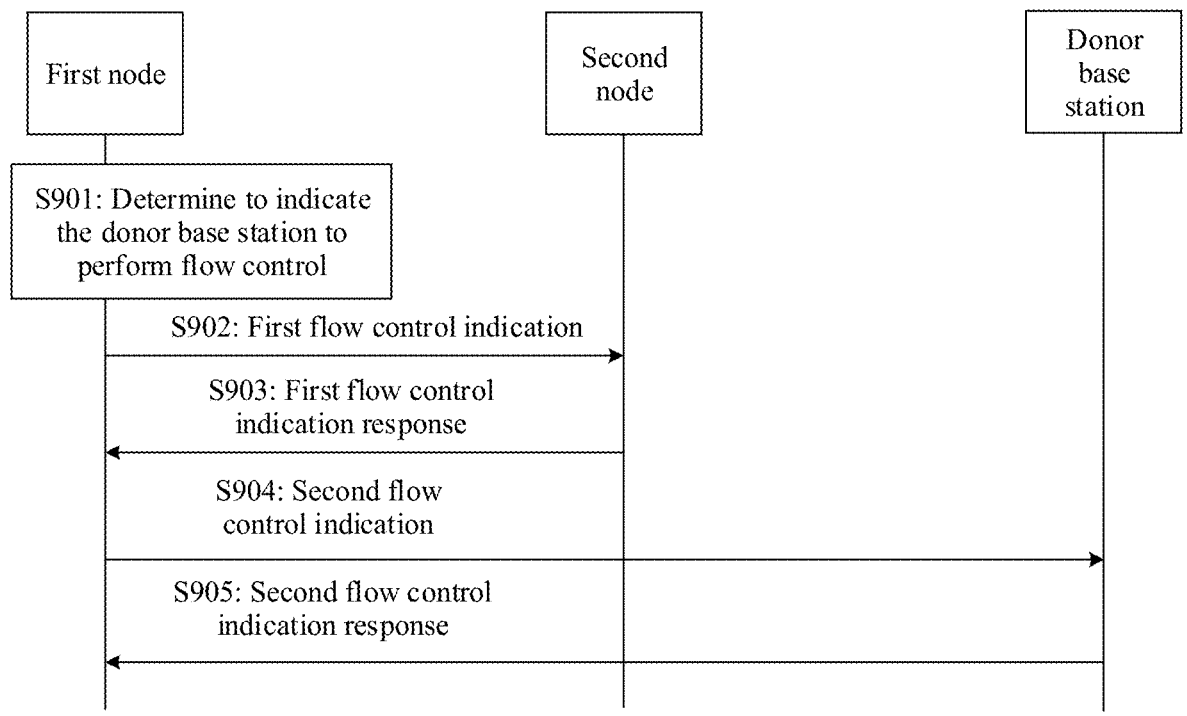
FIG. 9 is a flowchart in which a first node requests both a second node and a donor base station to perform flow control according to an embodiment of this application.

FIG. 9 is a flowchart in which a first node requests both a second node and a donor base station to perform flow control. Steps are as follows:

S901 to S903 are the same as steps S401 to S403. Details are not elaborated again.

S904 and S905 are the same as steps S702 and S703. Details are not elaborated again.

It should be understood that the embodiment shown in FIG. 9 may be that the first node simultaneously sends a first flow control indication and a second flow control indication respectively to the second node and the donor base station. It should not be understood that a sequence relationship exists between step S903 and step S905.

In this embodiment of this application, fast flow control may be implemented, and long-term flow control may also be implemented. When severe congestion occurs on one or more bearers of the first node, the first node may send the first flow control indication to the second node, so that the second node can rapidly reduce a downlink transmission rate of the first node, thereby avoiding congestion of the first node. In addition, the first node sends the second flow control indication to the donor base station, to directly reduce traffic in an IAB system in upstream, thereby avoiding congestion of an intermediate node.

In a possible implementation, the first node may include a donor base station notification indication in the first flow control indication, to indicate that the first node simultaneously indicates the donor base station to perform flow control. Similarly, the first node may also include an upper-level node notification indication in the second flow control indication, to indicate that the first node has sent a flow control indication to an upper-level node. Based on a definition in a protocol, after receiving the first flow control indication, the second node sends a flow control indication to an upper-level node of the second node, that is, a third node; or after receiving the second flow control indication, the donor base station sends a third flow control indication to the upper-level node of the second node. It should be understood that the upper-level node of the second node includes all upper-level nodes of the second node. If an IAB node receives both the flow control indication of the donor base station and a flow control indication of a lower-level node, the flow control indication of the donor base station is used as a main basis for flow control. This application does not limit an implementation of the IAB node in this case, and does not specify whether a flow control indication sent by a lower-level node is used as a basis for control or a flow control indication of the donor base station is used as a basis for flow control.

The foregoing mainly describes the solutions provided in the embodiments of this application from a perspective of interaction between the network elements. It may be understood that to implement the foregoing functions, each network element, for example, the first node, the second node, or the donor base station includes corresponding hardware structures and/or software modules for performing the functions. A person skilled in the art should be easily aware that, the network elements and the algorithm steps in the examples described with reference to the embodiments disclosed in this specification may be implemented in a form of hardware or a combination of hardware and computer software in this application. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

In the embodiments of this application, function modules in the first node, the second node, and the donor base station may be obtained through division based on the foregoing method examples. For example, each node may be divided into a plurality of different function modules, and two or more functions in each node may be integrated into one processing module. The integrated module may be implemented in a form of hardware, or may be implemented in a form of a software function module. It should be noted that, in the embodiments of this application, division into the modules is an example, and is merely logical function division. In actual implementation, another division manner may be used.

Figure 10:
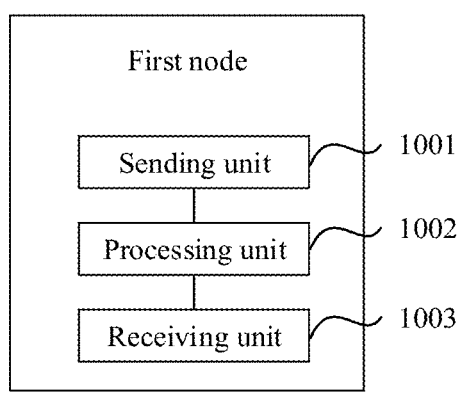
FIG. 10 is a schematic diagram of a possible structure of a first node according to an embodiment of this application.

FIG. 10 is a schematic diagram of a possible structure of the first node in the foregoing embodiments according to this application. In this application, the first node is a relay device. The first node includes a processing unit 1002 and a sending unit 1001. The processing unit 1002 is configured to support the first node in performing S401 in FIG. 4, S603 in FIG. 6, S701 in FIG. 7, S803 in FIG. 8, and S901 in FIG. 9. The sending unit 1001 is configured to support the first node in performing S402 in FIG. 4, S601 or S604 in FIG. 6, S702 in FIG. 7, S801 or S804 in FIG. 8, and S902 or S904 in FIG. 9.

Optionally, the first node further includes a receiving unit 1003, configured to support the first node in performing S403 in FIG. 4, S602 or S605 in FIG. 6, S703 in FIG. 7, S802 or S805 in FIG. 8, and S903 or S905 in FIG. 9.

During hardware implementation, the sending unit 1001 may be a transmitter, and the receiving unit 1003 may be a receiver. The receiver and the transmitter are integrated in a communications unit to form a communications interface or a transceiver. The communications interface or the transceiver may be a communications interface connected to other hardware, or may be an independent physical transceiver that communicates with another device in a wireless or wired manner.

Figure 11:
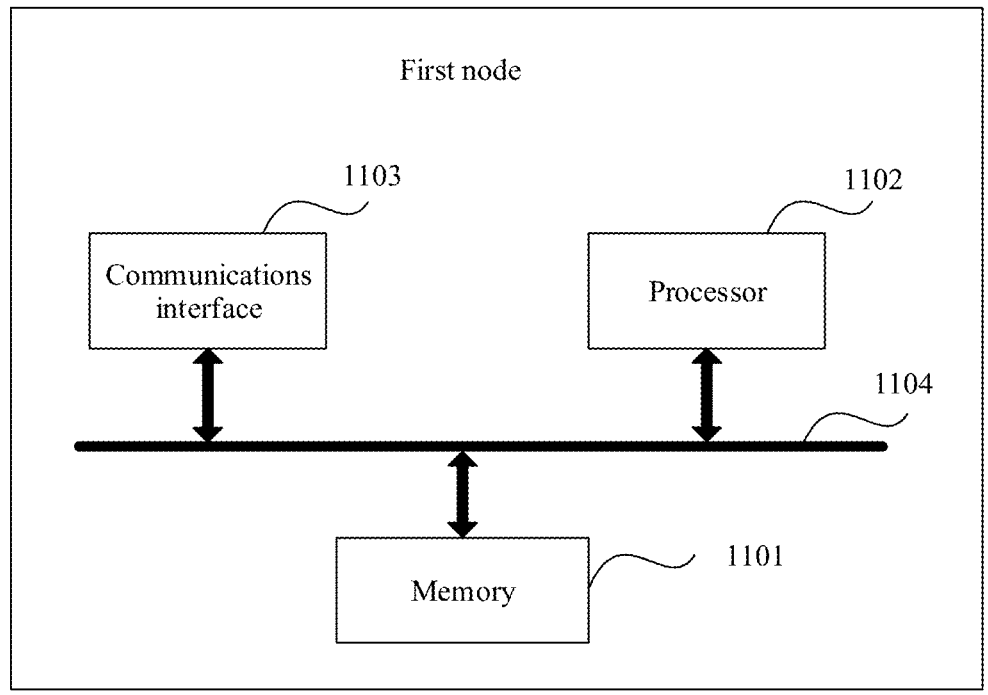
FIG. 11 is a schematic diagram of a possible logical structure of a first node according to an embodiment of this application.

FIG. 11 is a schematic diagram of a possible logical structure of the first node in the foregoing embodiments according to an embodiment of this application. The first node includes a processor 1102. In this embodiment of this application, the processor 1102 is configured to control and manage an action of the first node. For example, the processor 1102 is configured to support the first node in performing steps related to S401 in FIG. 4, S603 in FIG. 6, S701 in FIG. 7, S803 in FIG. 8, and S901 in FIG. 9 in the foregoing embodiments. Optionally, the first node may further include a memory 1101 and a communications interface 1103. The processor 1102, the communications interface 1103, and the memory 1101 may be connected to each other, or may be connected to each other through a bus 1104. The communications interface 1103 is configured to support the first node in performing communication, and the memory 1101 is configured to store program code and data of the first node. The processor 1102 invokes the code stored in the memory 1101 to perform control management. The memory 1101 may be coupled to or not coupled to the processor. Optionally, the communications interface, the memory, and the processor may be implemented in one integrated processor. The integrated processor is configured to support performing all functions and processing related to the processing unit 1002, the receiving unit 1003, and the sending unit 1001. Details are not elaborated again.

The processor 1102 or the integrated processor may be a central processing unit, a general-purpose processor, a digital signal processor, an application-specific integrated circuit, a field programmable gate array or another programmable logic device, a transistor logic device, a hardware component, or any combination thereof. The processor 1102 or the integrated processor may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The bus 1104 may be a peripheral component interconnect (PCI) bus, an extended industry standard architecture (EISA) bus, or the like. The bus may be classified as an address bus, a data bus, a control bus, or the like. For ease of representation, only one thick line is used to represent the bus in FIG. 11, but this does not mean that there is only one bus or only one type of bus.

Figure 12:
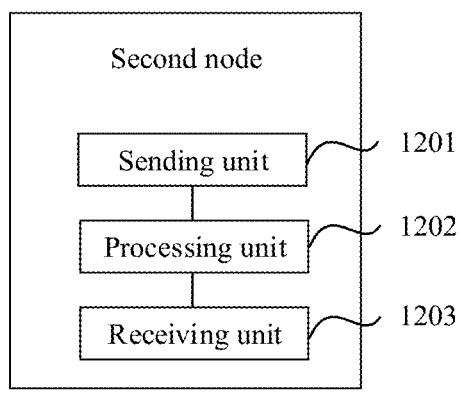
FIG. 12 is a schematic diagram of a possible structure of a second node or a donor base station according to an embodiment of this application.

FIG. 12 is a schematic diagram of a possible structure of the second node or the donor base station in the foregoing embodiments according to this application. In this application, the second node is a relay device or a donor base station. The second node includes a receiving unit 1203. The receiving unit 1203 is configured to: when the second node serves as a relay device, support the second node in performing S402 in FIG. 4, S601 or S604 in FIG. 6, S704 in FIG. 7, S806 in FIG. 8, and S902 in FIG. 9; and when the second node serves as a donor base station, support the second node in performing S402 in FIG. 4, S601 or S604 in FIG. 6, S702 or S705 in FIG. 7, S801 or S804 or S807 in FIG. 8, and S904 in FIG. 9.

Optionally, the second node further includes a sending unit 1201 and a processing unit 1202. When the second node serves as a relay device, the sending unit 1201 is configured to support the second node in performing S403 in FIG. 4, S602 or S605 in FIG. 6, S705 in FIG. 7, S807 in FIG. 8, and S903 in FIG. 9; and the processing unit 1202 is configured to support the second node in processing related received or sent messages in FIG. 4, FIG. 6, FIG. 7, FIG. 8, and FIG. 9, and is further configured to support the second node as a relay node in performing flow control processing in the foregoing embodiments. When the second node serves as a donor base station, the sending unit 1201 is configured to support the second node in performing S403 in FIG. 4, S602 or S605 in FIG. 6, S704 in FIG. 7, S802 or S805 or S806 in FIG. 8, and S905 in FIG. 9; and the processing unit 1202 is configured to support the donor base station in processing related received or sent messages in FIG. 4, FIG. 6, FIG. 7, FIG. 8, and FIG. 9, and is further configured to support the donor base station in performing flow control processing in the foregoing embodiments.

During hardware implementation, the sending unit 1201 may be a transmitter, and the receiving unit 1203 may be a receiver. The receiver and the transmitter are integrated in a communications unit to form a communications interface or a transceiver. The communications interface or the transceiver may be a communications interface connected to other hardware, or may be an independent physical transceiver that communicates with another device in a wireless or wired manner.

Figure 13:
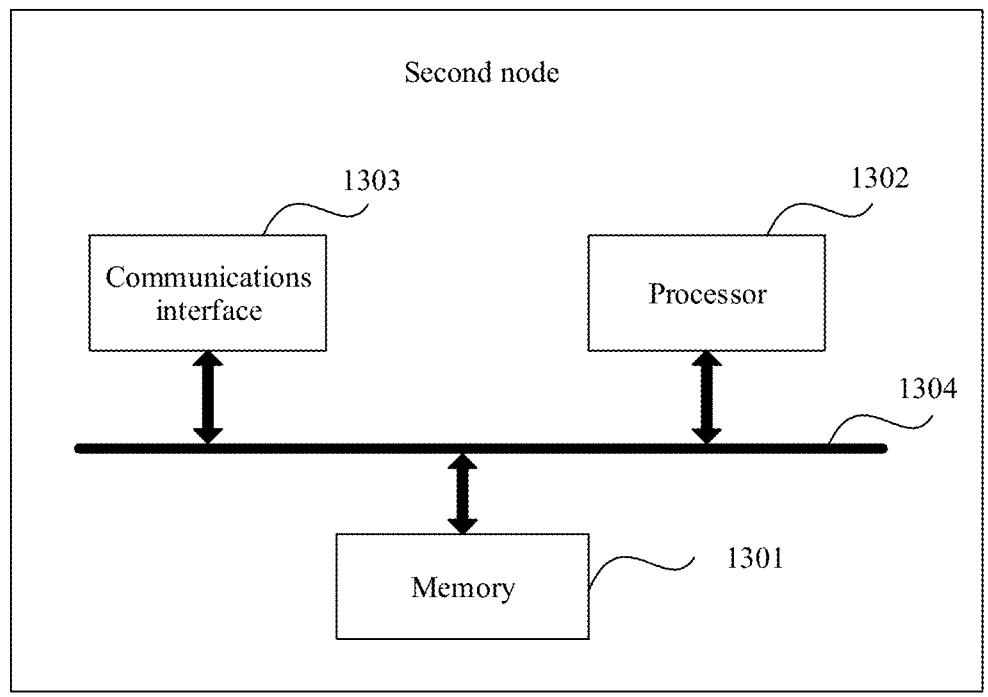
FIG. 13 is a schematic diagram of a possible logical structure of a first node or a donor base station according to an embodiment of this application.

FIG. 13 is a schematic diagram of a possible logical structure of the second node or the donor base station in the foregoing embodiments according to an embodiment of this application. The second node includes a processor 1302. In this embodiment of this application, the processor 1302 is configured to control and manage an action of the second node. For example, the processor 1302 is configured to: support the first node in processing related received or sent messages in FIG. 4, FIG. 6, FIG. 7, FIG. 8, and FIG. 9 in the foregoing embodiments, and support the second node as a relay node in performing flow control processing in the embodiments. Optionally, the first node may further include a memory 1301 and a communications interface 1303. The processor 1302, the communications interface 1303, and the memory 1301 may be connected to each other, or may be connected to each other through a bus 1304. The communications interface 1303 is configured to support the first node in performing communication, and the memory 1301 is configured to store program code and data of the first node. The processor 1302 invokes the code stored in the memory 1301 to perform control management. The memory 1301 may be coupled to or not coupled to the processor. Optionally, the communications interface, the memory, and the processor may be implemented in one integrated processor. The integrated processor is configured to support performing all functions and processing related to the processing unit 1202, the receiving unit 1203, and the sending unit 1201. Details are not elaborated again.

The processor 1302 or the integrated processor may be a central processing unit, a general-purpose processor, a digital signal processor, an application-specific integrated circuit, a field programmable gate array or another programmable logic device, a transistor logic device, a hardware component, or any combination thereof. The processor 1302 or the integrated processor may implement or execute various example logical blocks, modules, and circuits described with reference to content disclosed in this application. Alternatively, the processor may be a combination of processors implementing a computing function, for example, a combination of one or more microprocessors or a combination of a digital signal processor and a microprocessor. The bus 1304 may be a peripheral component interconnect (PCI) bus, an extended industry standard architecture (EISA) bus, or the like. The bus may be classified as an address bus, a data bus, a control bus, or the like. For ease of representation, only one thick line is used to represent the bus in FIG. 13, but this does not mean that there is only one bus or only one type of bus.

In another embodiment of this application, a readable storage medium is further provided. The readable storage medium stores computer executable instructions. When a device (which may be a single-chip microcomputer, a chip, or the like) or a processor performs the steps of the first node or the second node in the flow control methods provided in FIG. 4 to FIG. 9, the computer executable instructions in the storage medium are read. The foregoing readable storage medium may include any medium that can store program code, such as a USB flash drive, a removable hard disk, a read-only memory, a random access memory, a magnetic disk, or an optical disc.

In another embodiment of this application, a computer program product is further provided. The computer program product includes computer executable instructions, and the computer executable instructions are stored in a computer-readable storage medium. At least one processor of a device may read the computer executable instructions from the computer-readable storage medium, and the at least one processor executes the computer executable instructions, to enable the device to implement the steps of the first node and the second node in the flow control methods provided in FIG. 4 to FIG. 9.

In another embodiment of this application, a communications system is further provided. The communications system includes at least a first node and a second node. The first node may be the first node provided in FIG. 10 or FIG. 11, and is configured to perform the steps of the first node in the flow control methods provided in FIG. 4 to FIG. 9; and/or the second node may be the second node provided in FIG. 12 or FIG. 13, and is configured to perform the steps performed by the second node in the flow control methods provided in FIG. 4 to FIG. 9. It should be understood that the communications system may include a plurality of first nodes and a plurality of second nodes, and the plurality of second nodes may simultaneously implement the flow control method.

In the embodiments of this application, after the second node obtains the first flow control indication of the first node, or after the second node, serving as the donor base station, obtains the second flow control indication, the second node may determine, based on the first flow control indication or the second flow control indication, to perform flow control on the one or more bearers requested by the first node. This avoids congestion of the first node or a spectrum resource waste caused by insufficient data transmission of the first node. Alternatively, the first node indicates both the second node and the donor base station to perform flow control. This avoids congestion of the relay system caused by uncoordination between relay nodes.

In conclusion, it should be noted that the foregoing descriptions are merely specific implementations of this application. However, the protection scope of this application is not limited thereto. Any variation or replacement within the technical scope disclosed in this application shall fall within the protection scope of this application. Therefore, the protection scope of this application shall be subject to the protection scope of the claims.

What is claimed is:

1. A flow control method, comprising:
generating, by a first node or a device in the first node, a first flow control indication and a second flow control indication;
sending, by the first node or the device, the first flow control indication to a second node, wherein the first flow control indication is carried in adaptation layer control signaling, the first flow control indication comprises an identifier of a first radio link control (RLC) backhaul channel and flow control information, and wherein the second node is a relay node and the second node is an upper-level node of the first node; and
sending, by the first node or the device, the second flow control indication to a donor node of the first node, wherein the second flow control indication is carried in an F1 interface message and the second flow control indication comprises an identifier of a second RLC backhaul channel.

2. The method according to claim 1, wherein before the sending, by the first node or the device, the first flow control indication to the second node, the method comprises:
determining, by the first node or the device, that a data volume of a receive buffer in the first node or in the device is greater than a first threshold, that a data volume of a transmit buffer in the first node or in the device is greater than a second threshold, or that a data volume of a shared buffer on a first bearer in the first node or in the device is greater than a third threshold.

3. The method according to claim 1, further comprising:
receiving, by the second node or a device in the second node, the first flow control indication from the first node.

4. The method according to claim 1, wherein the first flow control indication further comprises a donor node notification indication to indicate that the second flow control indication is sent by the first node to the donor node.

5. The method according to claim 1, further comprising:
controlling, by the second node or the device, transmission to the first node based on the first flow control indication.

6. The method according to claim 1, further comprising:
receiving, by the donor node, the second flow control indication from the first node.

7. A first device, which is a first node or a device in the first node, wherein the first device comprises:
at least one processor; and
one or more memories coupled to the at least one processor and storing programming instructions for execution by the at least one processor to cause the first node to:
generate a first flow control indication and a second flow control indication;

send the first flow control indication to a second node, wherein the first flow control indication is carried in adaptation layer control signaling, and the first flow control indication comprises an identifier of a first radio link control (RLC) backhaul channel and flow control information, and wherein the second node is a relay node and the second node is an upper-level node of the first node; and send the second flow control indication to a donor node of the first node, wherein the second flow control indication is carried in an F1 interface message and the second flow control indication comprises an identifier of a second RLC backhaul channel.

8. The first device according to claim 7, wherein the programming instructions, when executed by the at least one processor, before the sending the first flow control indication to the second node, cause the first node to:

determine that a data volume of a receive buffer in the first device is greater than a first threshold, that a data volume of a transmit buffer in the first device is greater than a second threshold, or that a data volume of a shared buffer on a first bearer in the first node is greater than a third threshold.

9. The first device according to claim 7, wherein the first flow control indication further comprises a donor node notification indication to indicate that the second flow control indication is sent by the first node to the donor node.

10. A wireless relay system, wherein the wireless relay system comprises:

a first node and a second node, wherein the second node is a relay node, and the second node is an upper-level node of the first node;

wherein the first node is configured to:

generate a first flow control indication and a second flow control indication;

send the first flow control indication to a second node, wherein the first flow control indication is carried in adaptation layer control signaling, and the first flow control indication comprises an identifier of a first radio link control (RLC) backhaul channel and flow control information; and send the second flow control indication to a donor node of the first node, wherein the second flow control indication is carried in an F1 interface message and the second flow control indication comprises an identifier of a second RLC backhaul channel;

wherein the second node is configured to:

receive the first flow control indication from the first node.

11. The wireless relay system according to claim 10, wherein, before the sending the first flow control indication to the second node, the first node is further configured to:

determine that a data volume of a receive buffer in the first node is greater than a first threshold, that a data volume of a transmit buffer in the first node is greater than a second threshold, or that a data volume of a shared buffer on a first bearer in the first node is greater than a third threshold.

12. The wireless relay system according to claim 10, wherein the second node is further configured to:

control transmission to the first node based on the first flow control indication.

13. The wireless relay system according to claim 10, wherein the first flow control indication further comprises a donor node notification indication to indicate that the second flow control indication is sent by the first node to the donor node.

14. The wireless relay system according to claim 10, wherein the wireless relay system further comprises the donor node, and the donor node is configured to receive the second flow control indication from the first node.

* * * * *